United States Patent [19]

Molnar et al.

[11] Patent Number: 5,937,177
[45] Date of Patent: *Aug. 10, 1999

[54] CONTROL STRUCTURE FOR A HIGH-SPEED ASYNCHRONOUS PIPELINE

[75] Inventors: Charles E. Molnar, deceased, late of Sunnyvale, by Donna A. Molnar, executrix; Donna A. Molnar, Sunnyvale; Scott M. Fairbanks, Mountain View, all of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,755

[22] Filed: Oct. 1, 1996

[51] Int. Cl.$^6$ .............................. G06F 9/38; G06F 13/00
[52] U.S. Cl. .................... 395/376; 395/561; 395/568; 395/573; 395/595; 395/800.18; 395/800.25; 395/800.26
[58] Field of Search .................... 395/800, 376, 395/393, 561, 568, 573, 595, 390–391, 800.16–800.18, 800.25–800.26

[56] References Cited

U.S. PATENT DOCUMENTS

| | | | |
|---|---|---|---|
| 3,510,680 | 5/1970 | Cogar | 307/221 |
| 4,225,920 | 9/1980 | Stokes | 395/390 |
| 4,791,551 | 12/1988 | Garde | 395/501 |
| 4,819,201 | 4/1989 | Thomas et al. | 365/221 |
| 5,187,800 | 2/1993 | Sutherland | 395/800.18 |
| 5,572,691 | 11/1996 | Molnar et al. | 395/376 |
| 5,574,925 | 11/1996 | Paver | 395/800.25 |
| 5,638,009 | 6/1997 | Sutherland et al. | 326/83 |

OTHER PUBLICATIONS

M. Morris Mano, "Digital Design", 1984, Prentice–Hall, pp. 421–427.

Sutherland, Sproull and Associates (SSA #4179), "FIFO Controls Four–Phase Storage Elements", Sep. 22, 1985, pp. 1–26.

Seitz, Charles, "System Timing," Chapter 7 in *Introduction to VCSI Design*, Carver Mead and Lynn Conway, 1980.

Ivan E. Sutherland, "Micropipelines," Communications of the ACM, Jun. 1989.

Robert Sproull et al., "Counterflow Pipeline Processor Architecture," Sun Microsystems Laboratories, Inc., Apr. 1994.

Sutherland, Sproull & Associates, Memo SSA#4179, Sep. 22, 1985, pp. 1–10 with Figs. 1a–18. .

Mead & Conway, Chapter 7, pp. 259–261.

*Primary Examiner*—Parshotam S. Lall
*Assistant Examiner*—Bharat Barot
*Attorney, Agent, or Firm*—Finnegan, Henderson, Farabow, Garrett & Dunner

[57] ABSTRACT

Apparatus is disclosed for asynchronously controlling a pipeline. The control circuitry includes an alternating chain of control circuits and detection circuits. When a full control circuit precedes an empty control circuit in the chain, indicating that the data storage element corresponding to the full control circuit should transfer its data to the next storage element corresponding to the empty control circuit, the detection circuit generates a "move" signal. The "move" signal sets the preceding control circuit to empty and the following control circuit to full, thereby enabling movement of a data element from the preceding to the following stage. Because the control circuits are relatively simple and have predictable signal propagation times, the relative reactions of two adjacent control circuits to the common move signal can be tightly controlled. The control circuitry may control a counterflow pipeline, a forking pipeline, or a merging pipeline.

15 Claims, 17 Drawing Sheets

CONTROL STRUCTURE FOR A HIGH-SPEED ASYNCHRONOUS PIPELINE

BACKGROUND OF THE INVENTION

The present disclosure relates generally to the field of computer pipeline control and, more particularly, to circuit configurations for asynchronously transferring data through pipelines.

The pipeline processor is a common paradigm for very high speed computing machinery. Pipeline processors, or pipelines, operate on data as it passes along them. The most basic implementation of a pipeline is as a first-in-first-out (FIFO) memory, in which unaltered data are copied from one stage to the next in a pipelined fashion.

In a pipelined FIFO memory, when a full, or occupied, stage precedes an empty, or unoccupied, stage, logic is required to perform these key functions: (1) transfer the data from the full stage to the empty stage; (2) set the empty control state to full; and (3) set the full control state to empty. Ideally, data elements should move from the full to empty stage as soon as possible. Pipeline speed is maximized when all three actions are performed together. Data flow through a pipeline such as a FIFO memory may be either clocked (synchronous) or non-clocked (asynchronous). In a clocked FIFO memory data elements typically march forward through successive stages in lock step, with each stage taking a fixed number of clock cycles (typically one or two). The clocked FIFO receives elements on a fixed schedule defined by the clock, and delivers them at the same fixed rate.

Asynchronous FIFO memories enjoy significant design advantages over clocked FIFO memories because each stage operates at its own pace, requiring only local communication between adjacent stages. By avoiding overhead for global clock distribution, asynchronous FIFO memories may operate at higher speeds and consume less power than a clocked FIFO memory.

FIG. 1 is a block diagram of the general structure of a conventional asynchronous FIFO memory 50. FIFO memory 50 includes an input section 100 and an output section 102. Coupled between input section 100 and output section 102 are data registers 104, 105, 106, and 107 that store and move the data elements through the FIFO memory. Each control circuit 110 through 113 is associated with a corresponding data register, 104 through 107, respectively.

When input section 100 has a data element ready to be placed into data register 104, section 100 checks the status of control circuit 110. If control circuit 110 indicates register 104 is empty, input section 100 transfers the data element to register 104 and control circuit 110 changes state to indicate that register 104 is full. If control circuit 110 indicates full and control circuit 111 indicates empty, the data element is then transferred to the next register 105. Simultaneously, or nearly simultaneously, control circuits 110 and 111 change state so that control circuit 110 now indicates empty and control circuit 111 now indicates full. In this manner, the data element will propagate through FIFO memory 50 until it finds a full stage directly ahead of it. When this happens, the data element stops and waits for the succeeding stage to become empty.

Because the data elements in FIFO memory 50 autonomously move through empty stages until stopped by a full stage, the speed of data movement depends on the time required by the individual registers and the control elements to sense the full/empty conditions and then move the data. Moving a data element involves: (1) latching the data element in the next stage in the FIFO memory, and (2) unlatching the data element in the previous stage. Therefore, increasing the speed of data movement requires binding the latching and unlatching operations as tightly as possible. Speed suffers if unlatching occurs too late after latching, system robustness suffers if unlatching occurs before latching completes.

FIG. 2 is a circuit diagram of a conventional circuit 200 implementing part of the FIFO memory 50 in FIG. 1. Registers 202 and 204 each correspond to one of registers 104 through 107, and control section 206 loosely corresponds to the control elements 110 through 113. Control section 206 includes serially-connected Muller C elements 208, 210, and 212, and exclusive-OR (XOR) gates 214 and 216.

A Muller C element is a well-known sequential circuit element that reproduces the value of its input nodes at its output node when the input nodes become logically identical. For example, if a C-element had inputs (low, low), its output would be low. If the input nodes changed to (high, low), its output would remain low. The output would change to high only when the input nodes changed to (high, high). C-elements 208, 210, 212 each have an inverted upper input (represented by a bubble). Thus, C-elements 208, 210, and 212 will replicate their lower input on their output node when the two inputs differ.

C-elements 208, 210, and 212 are connected so that each C-element takes as one input the output of the previous (lower) C-element in the chain, and as the other input, the inverted output of the next (upper) C-element in the chain. Thus, a given C-element changes its output only when its state is different from the state of the previous C-element and the same as that of the next C-element in the chain.

XOR gate 216 receives the output of Muller C elements 208 and 210 and drives the gate input of register 204 with its output. Similarly, XOR gate 214 receives the output of Muller C element 210 and 212 and drives the gate input of register 202 with its output. Although FIG. 2 shows only two registers, any number of FIFO stages could be implemented by correspondingly extending the control section with additional C-elements and XOR gates, and adding the required number of registers to the data circuitry.

Table I illustrates exemplary timing relationships of the logic states of the circuit shown in FIG. 2 at the circuit points labeled A, B, C, D, E, F, and G.

TABLE I

| Time Interval | A | B | C | D | E | F | G |
|---|---|---|---|---|---|---|---|
| 0 | low | low | low | low | low | high | low |
| 1 | high | low | low | low | low | high | low |
| 2 | high | high | low | high | low | high | low |
| 3 | high | high | high | low | high | high | low |
| 4 | high | high | high | low | low | high | high |

At time interval 0, point F is high, indicating that the data register below is fill and the value that it contains is present at point H. Points E and D are low, indicating that registers 202 and 204 are empty. In interval one, C-element 208 changes state so that the value at point A matches that at point F. Next, the output of C-element 208 propagates to C-element 210 and the output D of XOR gate 216 becomes high, indicating that register 204 should latch its input data (interval two). Also in interval two, output B of C-element 210 becomes high. Since output B serves as input to C-elements 208 and 212, and to XOR gates 214 and 216, this change in output B has multiple consequences that appear in interval three.

At time interval three, C-element 212 outputs a high voltage at point C in response to the high value at point B, since its inverting input from point G is low. Also in response to the high voltage at point B, output D of XOR gate 216 changes to low, indicating that register 204 is now empty. In further response to the high voltage at point B, the output E of XOR gate 214 changes to high, indicating that its register 202 is now full. Finally, the high value of point B is applied to the inverting input of C-element 208, so that it can respond to a subsequent change in input F from high to low that would announce the availability of a second data value at the data input to data register 204.

In interval four, output E of XOR gate 214 returns to its original low value as a consequence of the high value at point C. The low value of point E indicates that its data register 202 is empty, having passed the first data value on to the next stage of the pipeline, which is not shown. The initially low value at point G indicated that the next stage of the pipeline was ready to accept the value of register 202 when point C changed to the high value. Thus, in interval four, points D and E have returned to their initial low values, indicating empty. Any time after point A changed from low to high in interval 1, the circuit could receive a second data value that would be signaled by a change in point F from high to low. The second and subsequent data values can propagate correctly, in an orderly fashion, though an unlimited number of pipeline stages of the kind described above.

Correct and efficient movement of the data elements from register 204 to register 202 in FIG. 2 depends on accurate timing of the changes in the register gate signals at points D and E, so that D drives register 204 empty and E drives register 202 full as soon as possible without corrupting the data element. Unfortunately, the relative timing of the state changes at points E and D when point B changes state is subject to the difference of delays in XOR circuits 214 and 216. XOR gates are relatively complicated circuits that can introduce significant timing uncertainties into the FIFO memory shown in FIG. 2, and those uncertainties reduce the maximum safe operating speed of the circuit.

There is, therefore, a need to reduce timing uncertainties in an asynchronous pipeline, such as a FIFO memory, and to couple control signals more tightly to increase operating speeds of such pipelines.

The need is even more critical when the timing of data movement is subject to additional constraints, such as in a counterflow pipeline. FIG. 3 is a block diagram illustrating a portion of a counterflow pipeline. Counterflow pipeline 300 includes a first pipeline 320 (called the "instruction pipeline") and a second pipeline 340 (called the "result pipeline"), which move data elements in opposite directions. In FIG. 3, instruction pipeline 320 moves data elements to the right and result pipeline 340 moves data elements to the left. The stages of pipeline 320 include serially-connected control sections 328 through 330 and their corresponding data element storage and operation sections 322 through 324. Each section 322 through 324 includes memory for storing an instruction and associated information fields needed to execute the instruction. Data element storage and operation sections 322 through 324 may include, for example, an ALU capable of executing an integer instruction.

The stages of pipeline 340 include serially connected control sections 348 through 350 and corresponding result storage elements 342 through 344. The result storage elements store and transfer data values that result from or are needed for an instruction in one of storage and operation sections 322 through 324.

In operation, an instruction in each stage of pipeline 320 can interact with a result in the corresponding stage of pipeline 340. At each stage information in instruction sections 322 through 324 can be compared with information in corresponding result sections 342 through 344, respectively. If, for example, it is determined that section 322 requires as an operand a result that is in section 342, the result is copied into section 322. On the other hand, information can similarly be copied or transferred in the reverse direction, from the instruction pipeline to the results pipeline, where it will move and be available to interact with following instructions in the instruction pipeline. For correct operation of counterflow pipeline 300 for this and other applications, each result flowing down pipeline 340 must interact with each instruction flowing up pipeline 320. Even though the stage in which this interaction will take place is not known in advance, it is essential that such an interaction must take place in some stage, or an error will occur. Thus, it is required that the control circuits do not permit an instruction in pipeline 320 and a result in pipeline 340 to cross any stage boundary in opposite directions.

Thus, there is a further need and importance for asynchronous control circuitry having tightly coupled control signals which accurately control sophisticated pipelines such as a counterflow pipeline.

SUMMARY OF THE INVENTION

Control elements directly dictate the states of the pipeline data storage elements, and a single detector circuit simultaneously changes the states of the control elements of adjacent stages. By comparison, in the circuit 206 of FIG. 2, control information for data register 204 is stored in two C-elements, 208 and 210, and its full or empty state is determined by XOR gate 216. Removing XOR circuits from the control elements and implementing the detection circuitry in a simple signal path common to the preceding and succeeding control stages significantly reduces timing uncertainties in conventional circuits. The invention is useful in many different applications, such as asynchronous counterflow pipelines, forking pipelines, and merging pipelines.

The advantages and purposes in accordance with this the invention will be set forth in the following description and will also be obvious from the description, or may be learned by practicing the invention. The advantages and purpose of the invention will be realized and attained by means of the elements and combinations particularly pointed out in the appended claims.

To obtain the advantages, and in accordance with the purpose of the invention, as embodied and broadly described herein, one embodiment includes control circuitry for a FIFO memory comprising a first control circuit controlling a transfer state of a data storage element and a second control circuit controlling a transfer state of a second data storage element, a data output of the first data storage element coupled to a data input of the second data storage element. Additionally, a detection circuit receives signals from the first and second control circuits indicating the states of the corresponding first and second control circuits and generates a move signal based on the received signals.

Both the foregoing general description and the following detailed description are exemplary and explanatory only and do not restrict the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DETAILED DESCRIPTION

Reference will now be made in detail to the embodiments of the invention, examples of which are illustrated in the accompanying drawings. Wherever possible, the same reference numbers will be used throughout the drawings to refer to the same or like parts.

This invention includes apparatus for asynchronously controlling a serially-connected pipeline organized as a first-in-first-out (FIFO) pipeline. The first three embodiments described below provide fast, simple FIFO pipeline control circuitry allowing relative signal arrival times at the gates of data storage and transfer elements to be predictably and precisely controlled. Tightly binding the relative timing of the data storage and transfer elements in this way increases the FIFO memory operating speed without data corruption. The fourth, fifth, and sixth embodiments of this invention describe applications using novel modifications of the third embodiment.

The control circuitry for all embodiments includes an alternating chain of control circuits and detection circuits. When a control circuit in the Full state precedes a control circuit in the Empty state, indicating that the data storage element corresponding to the fill control circuit should transfer its data to the next storage element corresponding to the empty control circuit, the detection circuit generates a "move" signal. The "move" signal sets the state of the preceding control circuit to Empty and the following control circuit to Full, thereby enabling movement of a data element from the preceding to the following stage. Because the control circuits are relatively simple and have predictable signal propagation times, the relative reaction times of two adjacent control circuits to the common move signal can be tightly controlled.

FIGS. 4–7 show the first embodiment of an asynchronous FIFO according to the present invention, using a control circuit that stores full/empty state information as charge on a circuit capacitance. Simulations of this embodiment indicate that data propagation rates well above 1 GHz are possible using a 0.6 micron CMOS fabrication process.

Figure 1:
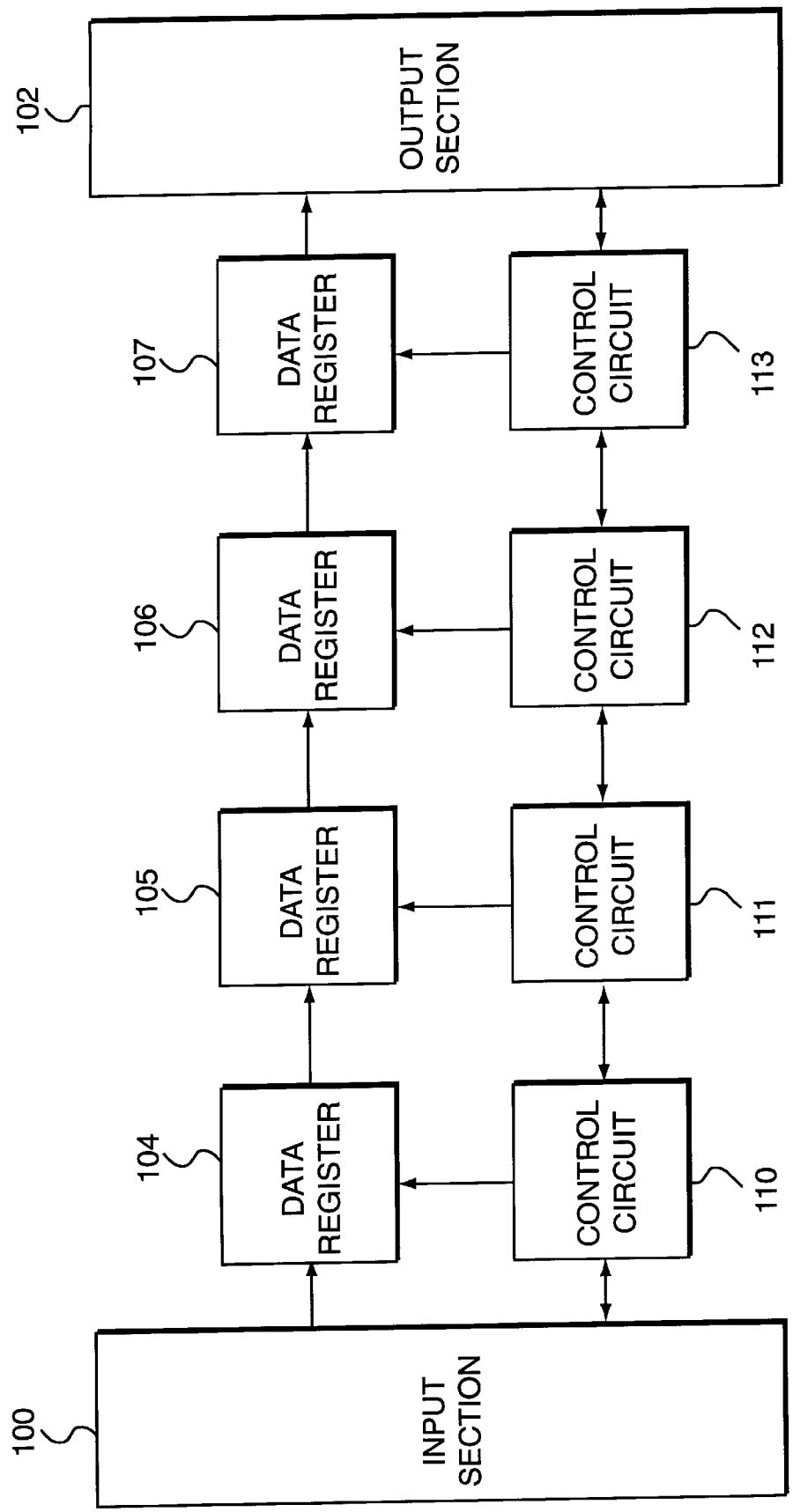
FIG. 1 is a block diagram of the general structure of a conventional asynchronous FIFO memory.
Figure 2:
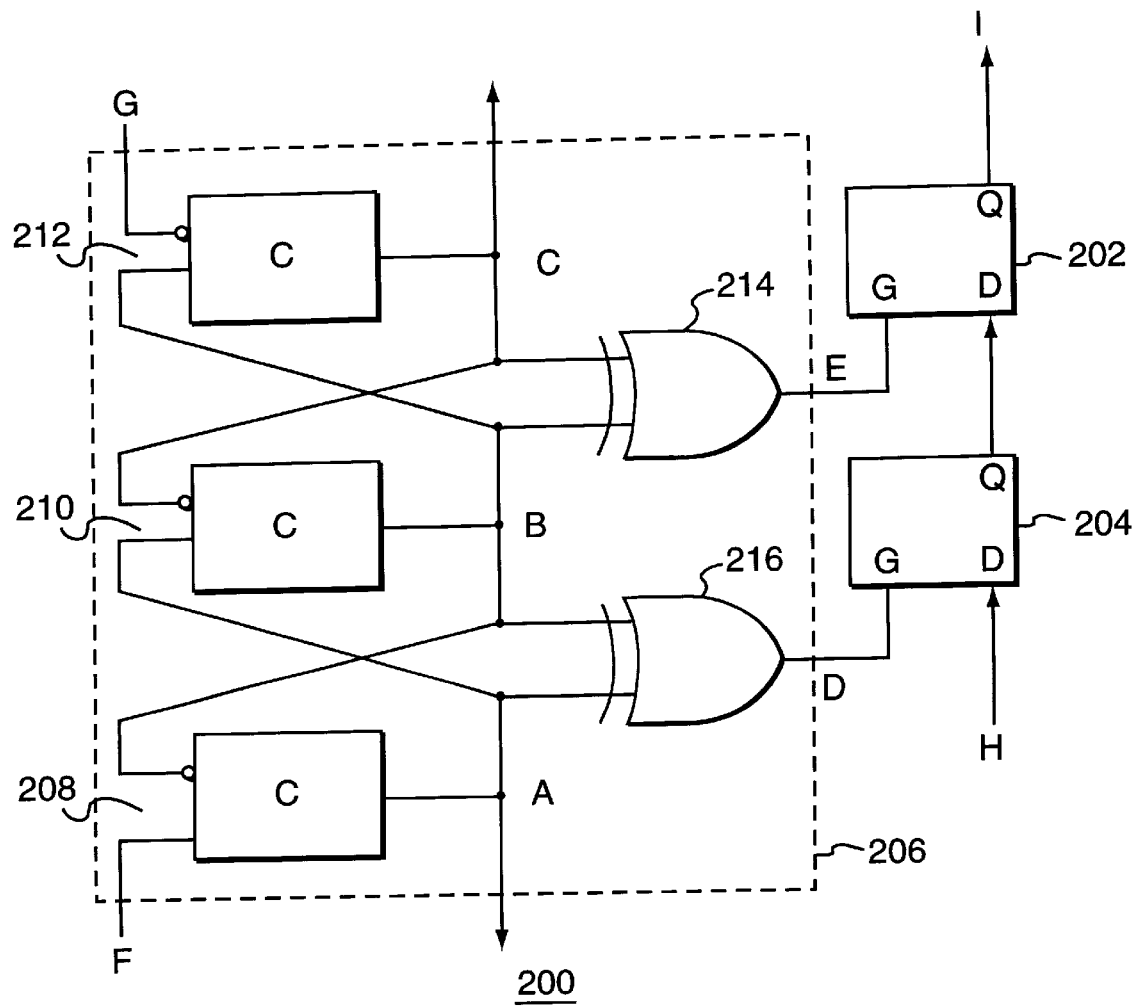
FIG. 2 is a diagram of a conventional pipeline control circuit.
Figure 3:
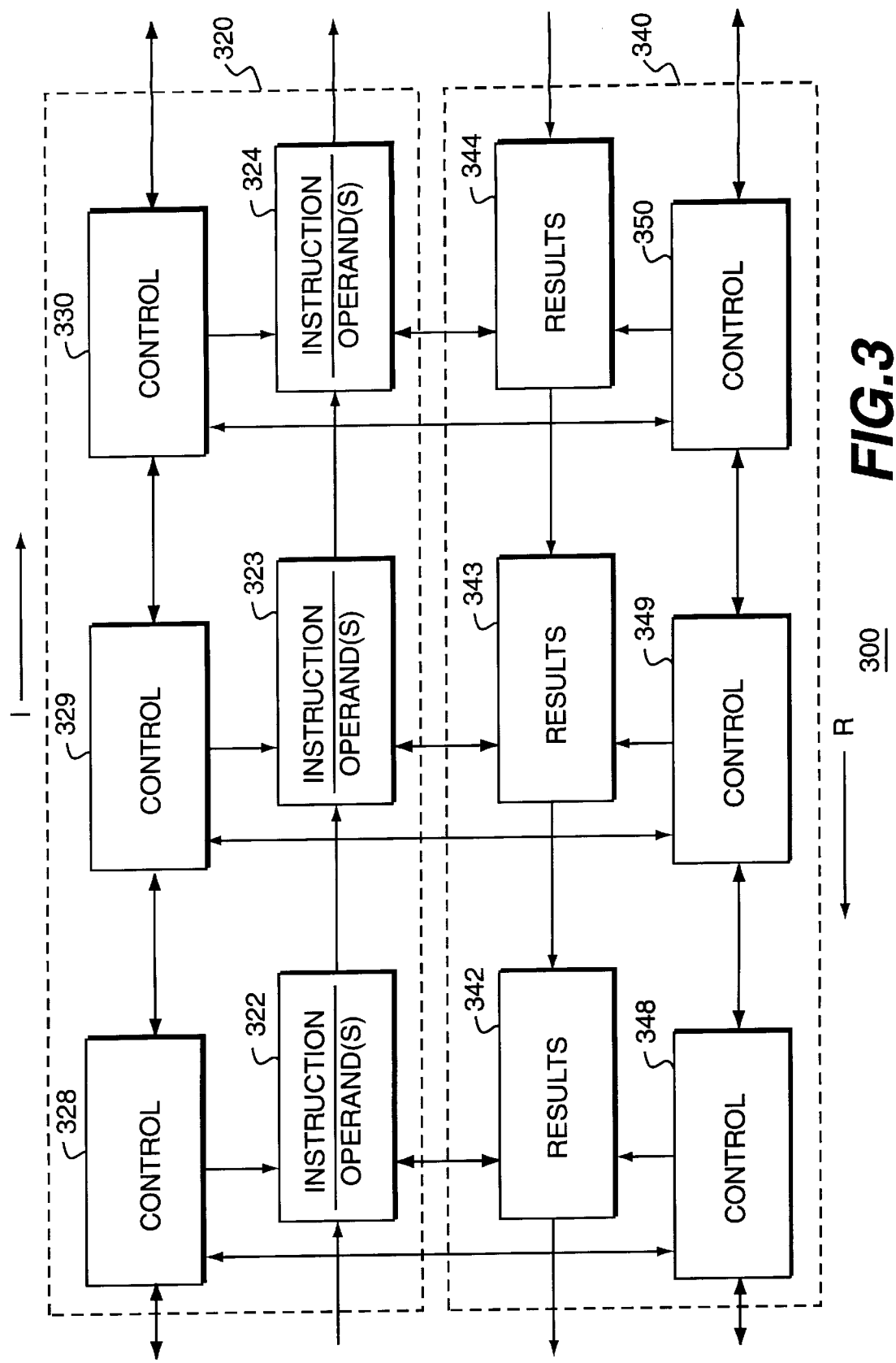
FIG. 3 is a block diagram illustrating a portion of a conventional counterflow pipeline.
Figure 4:
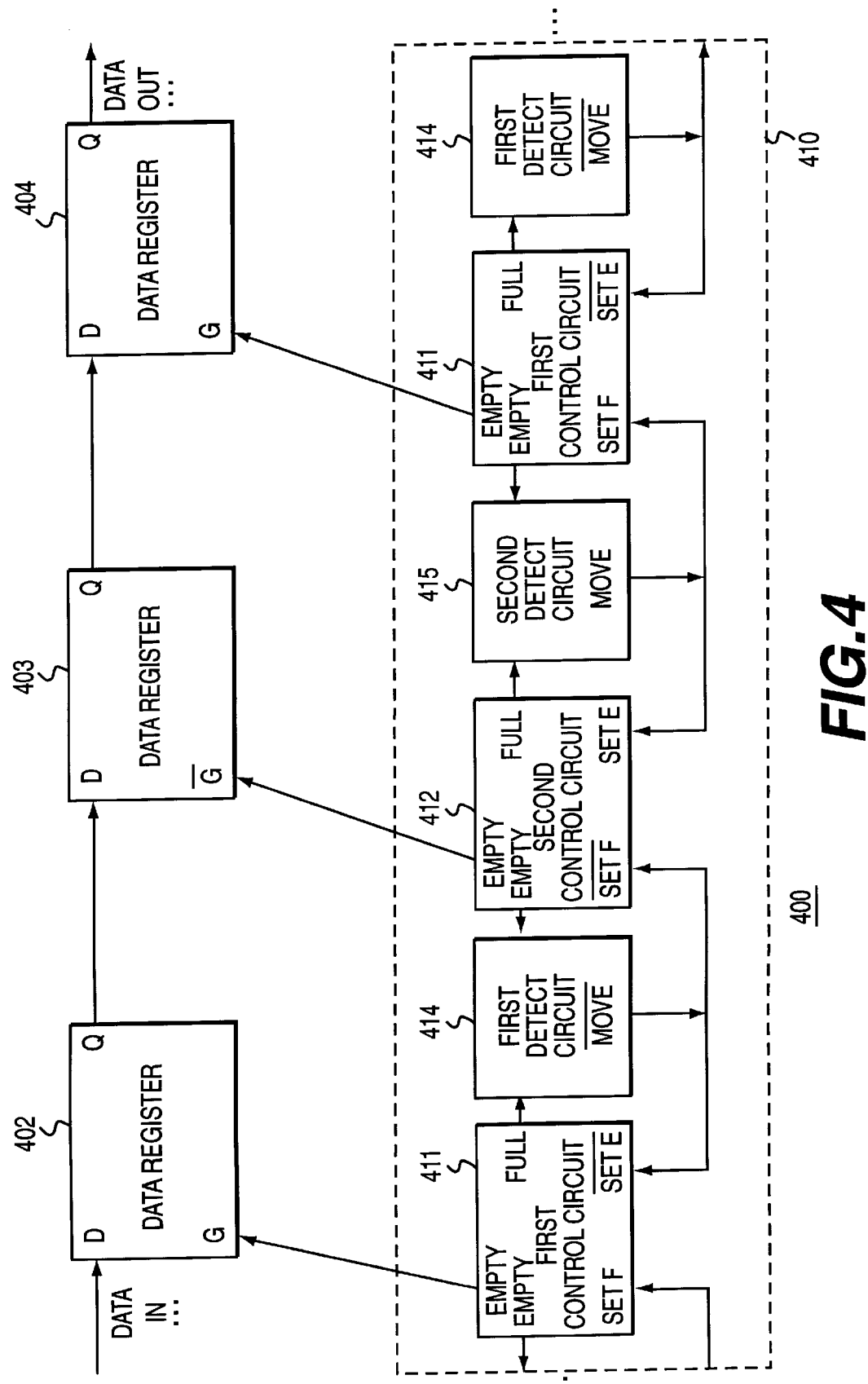
FIG. 4 is a high level block diagram showing a first embodiment of the structure of an asynchronous FIFO pipeline.

FIG. 4 is a high level block diagram 400 of the first embodiment of the structure of the asynchronous FIFO pipeline. The diagram shows three stages of the FIFO pipeline for illustration, although in practice, the FIFO pipeline could have many more stages.

Serially-connected registers 402–404 store and transfer data through each stage of FIFO pipeline 400. Registers 402–404 transfer data received at input D to output Q when a signal at their gate input G is active, indicating the register is Empty. When the gate signal is inactive, registers maintain their data output Q at the last value because they are Full. To operate properly with the control circuitry, registers 402–404 are arranged to alternate between active high and active low gate signals. Registers 402 and 404 are driven Full by a low voltage signal and register 403 is driven Full by a high voltage signal.

Control section 410 includes an alternating series of a first control circuit 411, a first detection circuit 414, a second control circuit 412, and a second detection circuit 415. Circuit 411 controls the gate input to registers 402 and 404, and circuit 412 controls the gate input to register 403. Each detection circuit 414 and 415 monitors the states of two adjacent control circuits and provides a move signal to such circuits whenever a control circuit indicating Full precedes a control circuit indicating Empty in the chain.

Figure 5A:
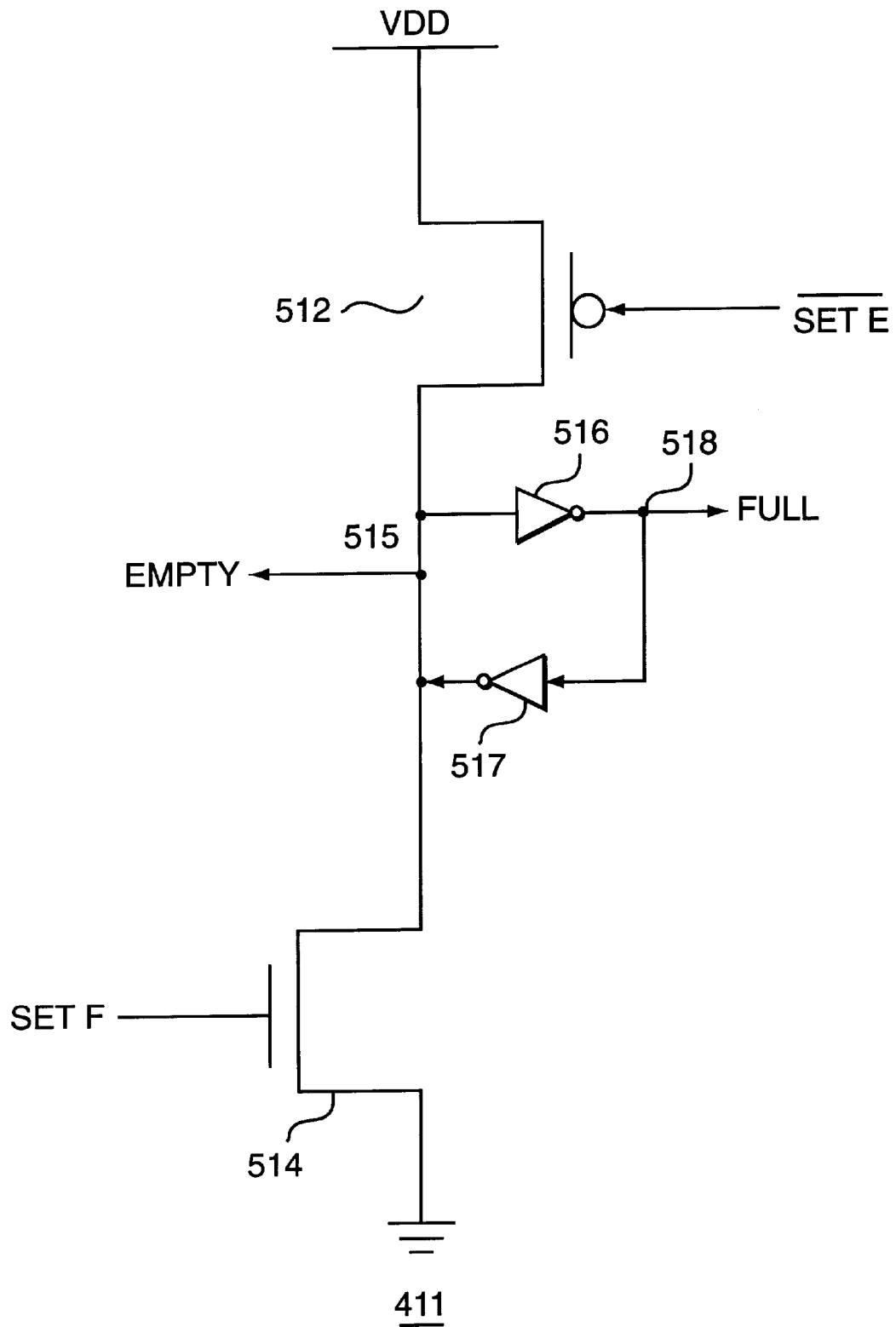
FIGS. 5A and 5B are diagrams of control circuits as used in the first embodiment of the invention.
Figure 5B:
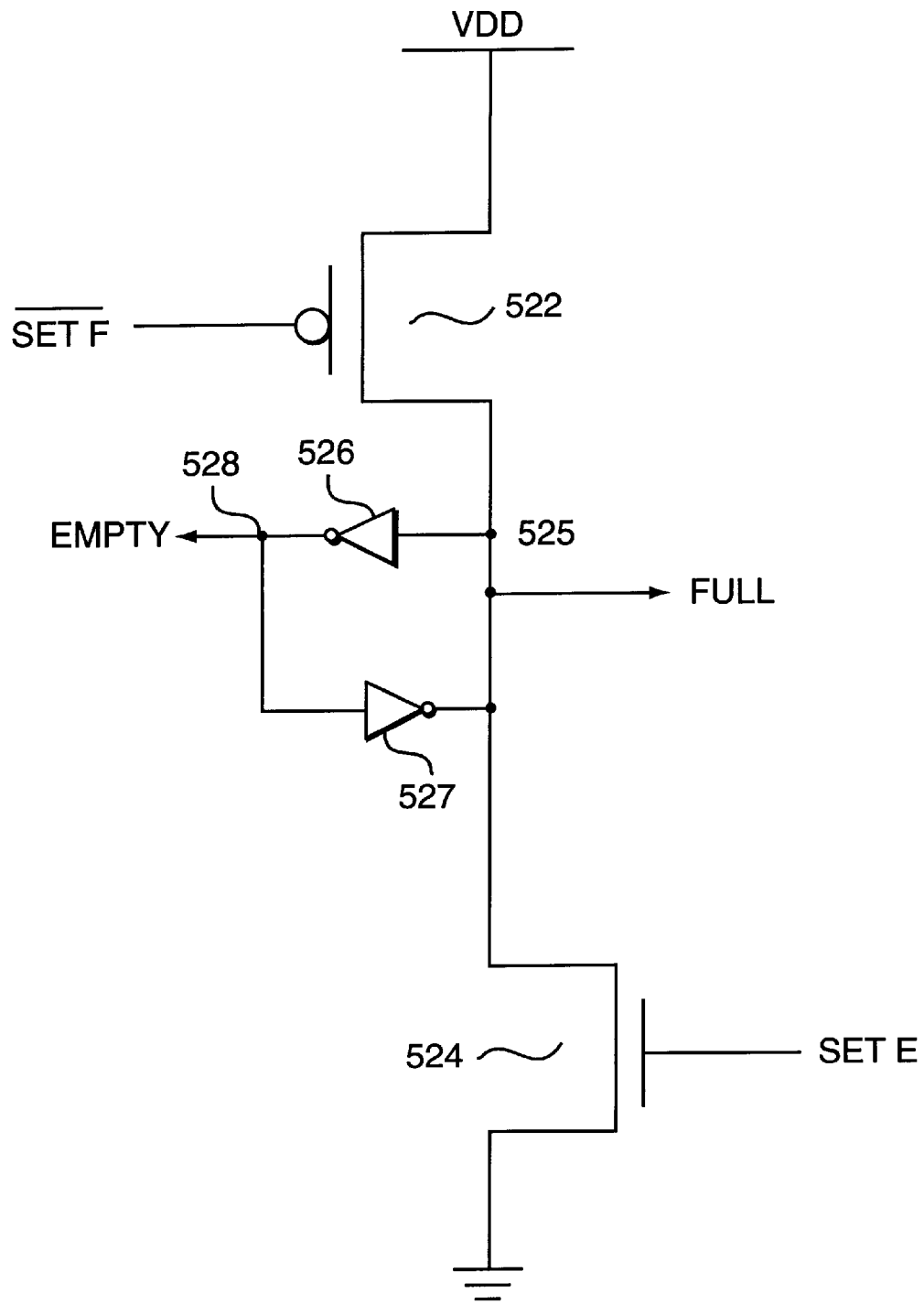

FIGS. 5A and 5B are circuit diagrams illustrating control circuits 411 and 412 as used in the first embodiment. It is possible to construct a similar control section that uses only one kind of control circuit alternating with one kind of detection circuit, but the circuit 400 shown in FIG. 4 operates more rapidly and also includes inverters (illustrated in FIGS. 5A and 5B at 516 and 526, respectively) that simplify addition of "keeper" circuits that make the circuit capable of static operation, as will be explained. Control circuit 411 comprises a PMOS transistor 512 connected in series with an NMOS transistor 514. The Empty/Full state information is stored at node 515 as charge on surrounding circuit capacitance, which includes gate capacitance from inverter 516 and capacitance due to various diffusion and wiring stray capacitances.

PMOS transistor 512 is turned on by placing its gate Set ⌐E (set Empty) ("⌐" indicates active low) to the low state, and NMOS transistor 514 is turned on by placing its gate input Set F (set Full) to the high state. Turning transistor 512 on while transistor 514 is off sets node 515 to Vdd (high), and turning transistor 514 on while transistor 512 is off sets node 515 to ground (low).

Inverters 516 and 517 are connected in a "circular" arrangement between node 515 and the Full output of circuit 411. Inverter 517 functions as a "keeper" inverter that replaces charge leaking from node 515 when both transistors 512 and 514 are turned off. Without keeper inverter 517, node 515 would lose its charge state due to leakage current, and require recharging by periodically turning on one of transistors 512 and 514. Keeper inverter 517 thus preserves the state of node 515, even when the pipeline is inactive for long periods; such a circuit is called "static". The keeper inverter 517 may be omitted if it is known that the pipeline will always be operated at sufficiently short intervals; such a circuit is called "dynamic".

Keeper inverter 517 is a "weak" inverter that can provide only a small amount of output current relative to PMOS transistor 512 and NMOS transistor 514. Typically, the width of the transistors in keeper inverter 517 may approximately 10–20 times smaller than the width of those in inverter 516. For example, keeper inverter 517 may have a width of about 1.2 microns for both its P and N channel transistors, while inverter 516 has a width of about 24 microns for its P-channel transistors and 12 microns for its N-channel transistors. In comparison, transistors 512 and 514 may have widths of approximately 36 microns and 18 microns, respectively.

Control circuit 412, shown in FIG. 5B, comprises PMOS transistor 522, NMOS transistor 524, inverter 526, and keeper inverter 527. Circuit 412 is a structurally identical, but mirror image of circuit 411. In circuit 412, however, the gate inputs at the PMOS and NMOS transistors and the output are assigned different meanings than the corresponding structure in circuit 411. In particular, in circuit 412, the gate of transistor 522 is designated Set ⌐F and the gate of transistor 524 is designated Set E. Additionally, a high voltage at the left output 528 of inverter 526 indicates Empty, and a high voltage at the right output indicates Full.

Figure 6A:
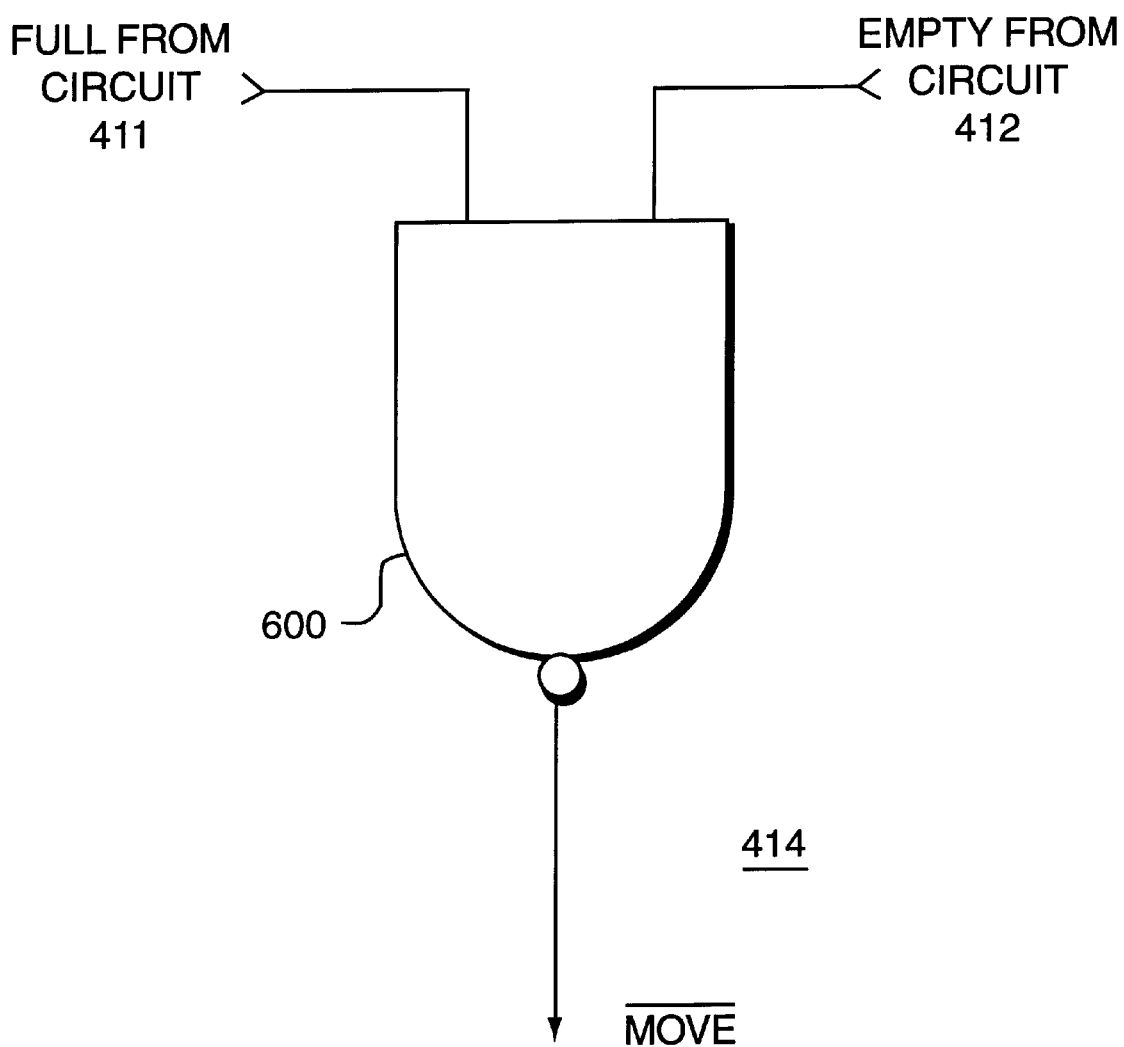
FIGS. 6A and 6B are diagrams of a preferred embodiment of detection circuits as used in the first embodiment of the invention.

FIG. 6A is a circuit diagram of a preferred embodiment of detection circuitry 414 as a NAND gate 600 receiving as input the Full output 518 of circuit 411 and the Empty output 528 of circuit 412. The output of detection circuit 414 (i.e. the Move ⌐ signal) is input to the Set ⌐E input of circuit 411 and the Set ⌐F input of circuit 412. Detection circuitry 414 operates to detect the Full condition of circuit 411, expressed by a high value on node 518, and the Empty condition of circuit 412, expressed as a high value on node 528.

Figure 6B:
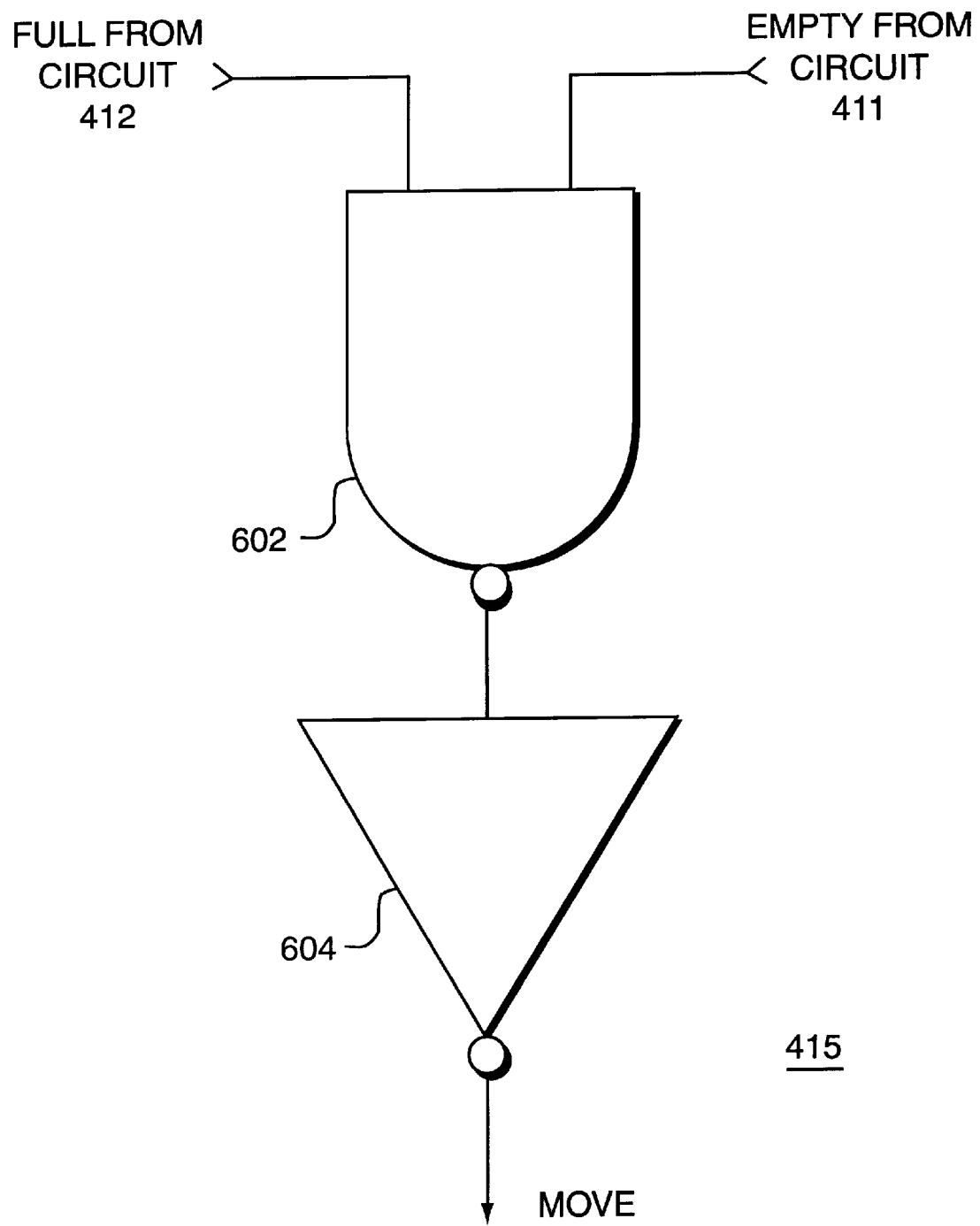

FIG. 6B is a circuit diagram of a preferred embodiment of detection circuit 415 as a NAND gate 602 receiving as inputs the Full output 525 of circuit 412 and the Empty output 515 of circuit 411, and an inverter 604 connected to the output of NAND gate 602. The output of inverter 604 (i.e. the move signal) is input to the Set E input of circuit 412 and the Set F input of circuit 411. Detection circuit 415 detects the Full condition of circuit 412, expressed by a high value of node 525, and the Empty condition of circuit 411, expressed by a high value of node 515 of circuit 411.

Figure 7:
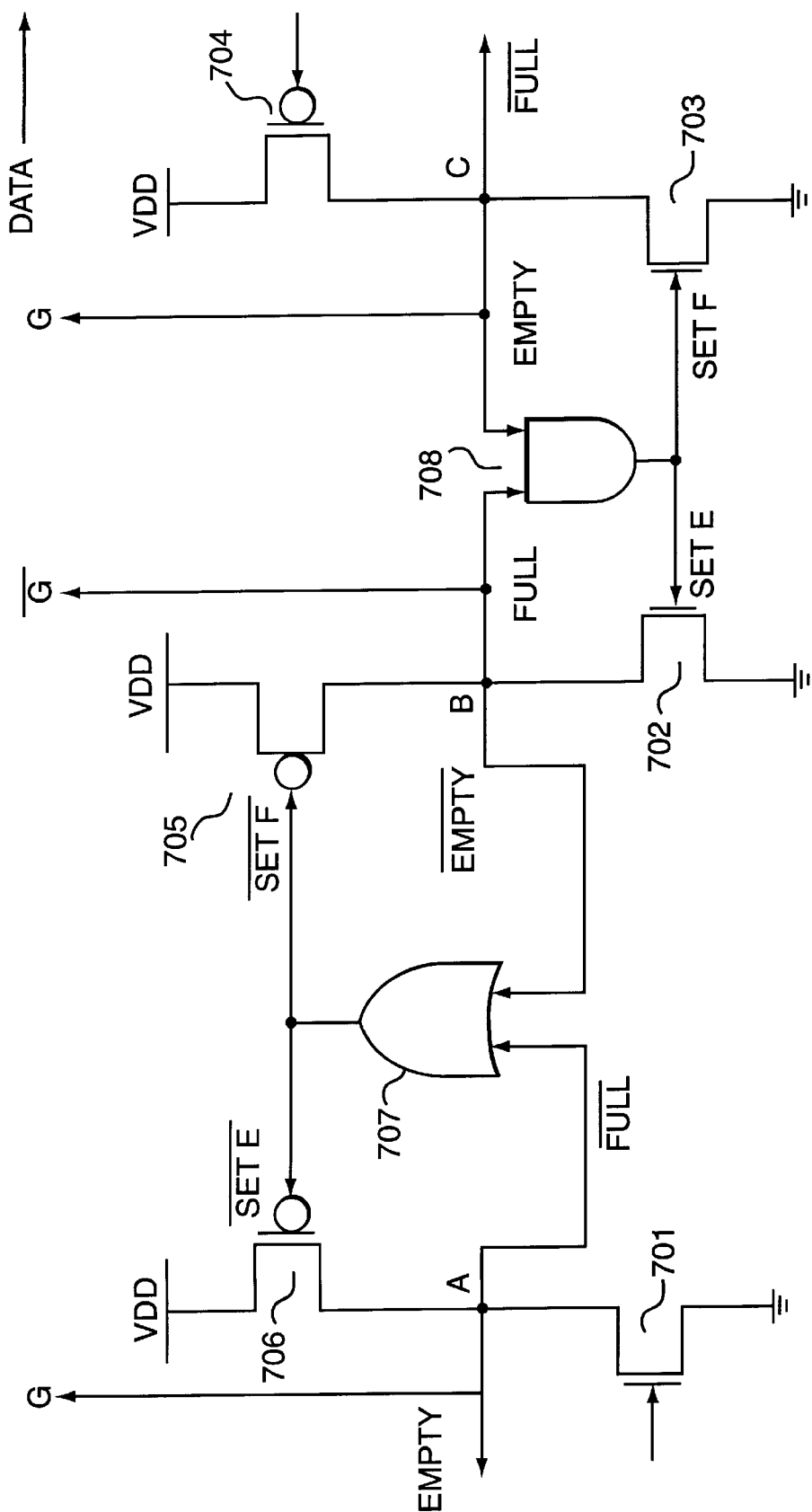
FIG. 7 is a conceptual diagram of a simplified portion of the asynchronous pipeline control circuitry used in the first embodiment of the invention.

FIG. 7 is a circuit diagram illustrating a portion of control section 410 shown in FIGS. 4, 5, and 6, redrawn as a single figure. For simplicity and ease of understanding the circuit operation FIG. 7 depicts, inverters 516 and 526 of FIGS. 5A and 5B, respectively, and detection circuit 414 of FIG. 6A, as their logically equivalent OR gate 707, and the detection circuit 415 of FIG. 6B, is shown as its logically equivalent AND gate 708. Transistors 704, 705, and 706 are PMOS transistors and transistors 701, 702, and 703 are NMOS transistors.

To demonstrate the operation of this circuit, we start with the assumption that nodes A, B and C have values of low, high, and high, respectively. This corresponds to the Full, Full and Empty states. Since the values at nodes B and C are both high, AND gate 708 applies a high level to the gate of the two opposing NMOS transistors 702 and 703. This turns transistors 702 and 703 on and sets nodes B and C low. The circuit states of nodes A, B and C at this intermediate step now indicate the conditions Full, Empty, Full, respectively. Thus, the fill condition expressed by node B has moved to node C, and the empty condition expressed by node C has moved to node B. These changes of circuit states B and C are coupled to the gate inputs of the associated data registers, producing a corresponding movement of the data value held in the data register associated with node B to the data register associated with node C.

A next step now occurs when the new low level at node B reaches OR gate 707, which continues to receive a low input from node A. The output of OR gate 707 applies a low level to the gates of PMOS transistors 705 and 706, turning them on and setting nodes A and B high. After this step, nodes A, B and C express the values Empty, Full, Full, respectively. The Full values originally expressed by nodes A and B have both moved to the right, into nodes B and C, so that the data value originally held in the data register associated with node A is now held in the data register associated with node B, whose contents have in turn been moved to the data register associated with node C.

In a similar fashion, data values associated with node C can move to the right into subsequent stages of the pipeline, and new data values can flow into the stage associated with node A from additional stages extending to the left of stage A. Repetition of such cycles of operation, each cycle involving interactions only between neighboring stages, moves data elements to the right through the pipeline so long as there are empty cells available to hold them.

Although the preferred embodiment has been described using registers as the data storage and transfer elements, many equivalent implementations could also be used. Additionally, amplification of control signals G and G⌐, shown in FIG. 4, through one or more buffer stages may be needed when multiple data registers are driven to permit movement of data with multiple bits. Furthermore, instead of using registers with alternating gate polarities, the buffer stages may be arranged to invert the gate polarity.

Figure 8:
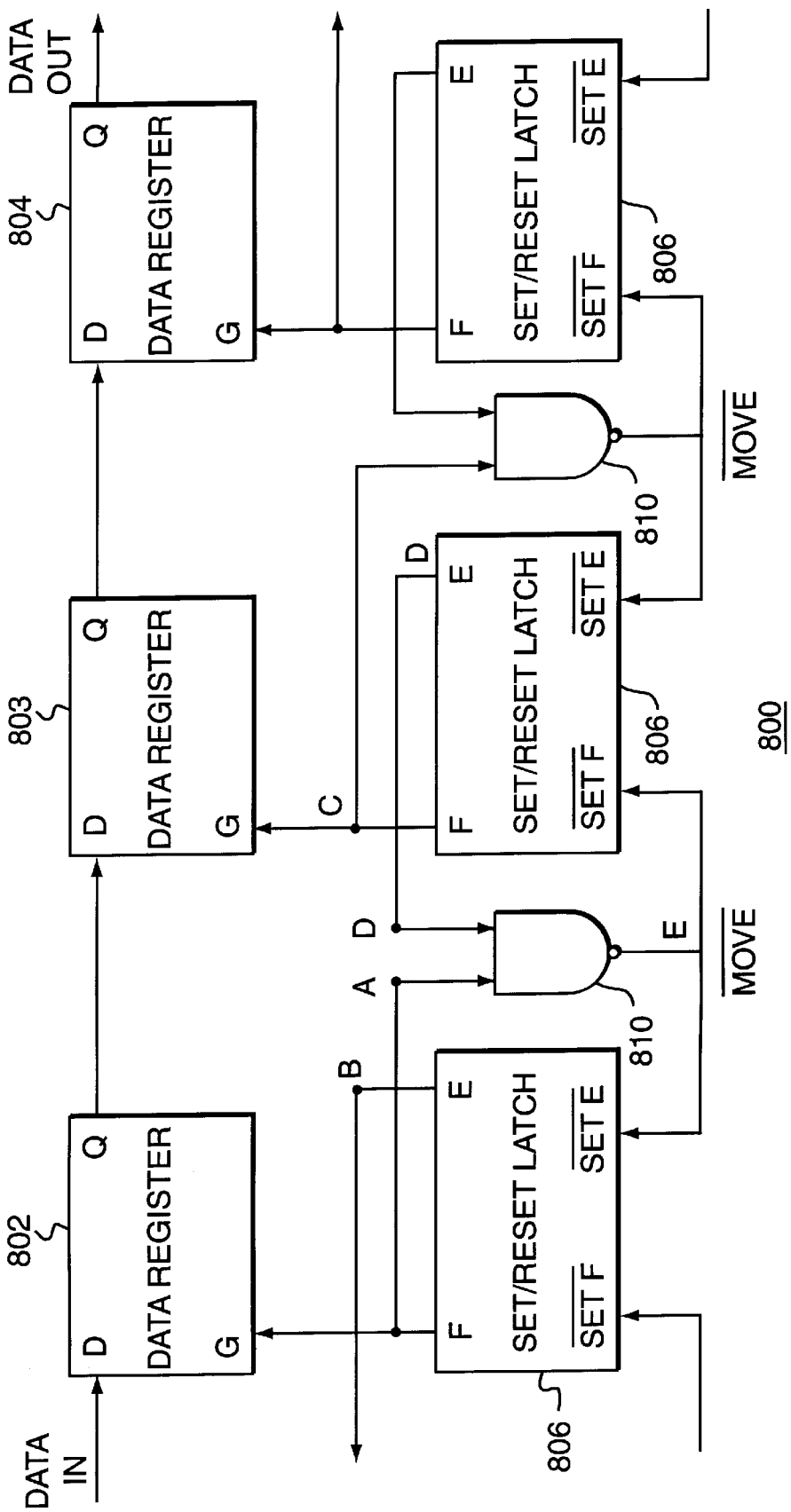
FIG. 8 is a circuit diagram showing a the structure of an asynchronous FIFO pipeline according to a second embodiment.
Figure 9:
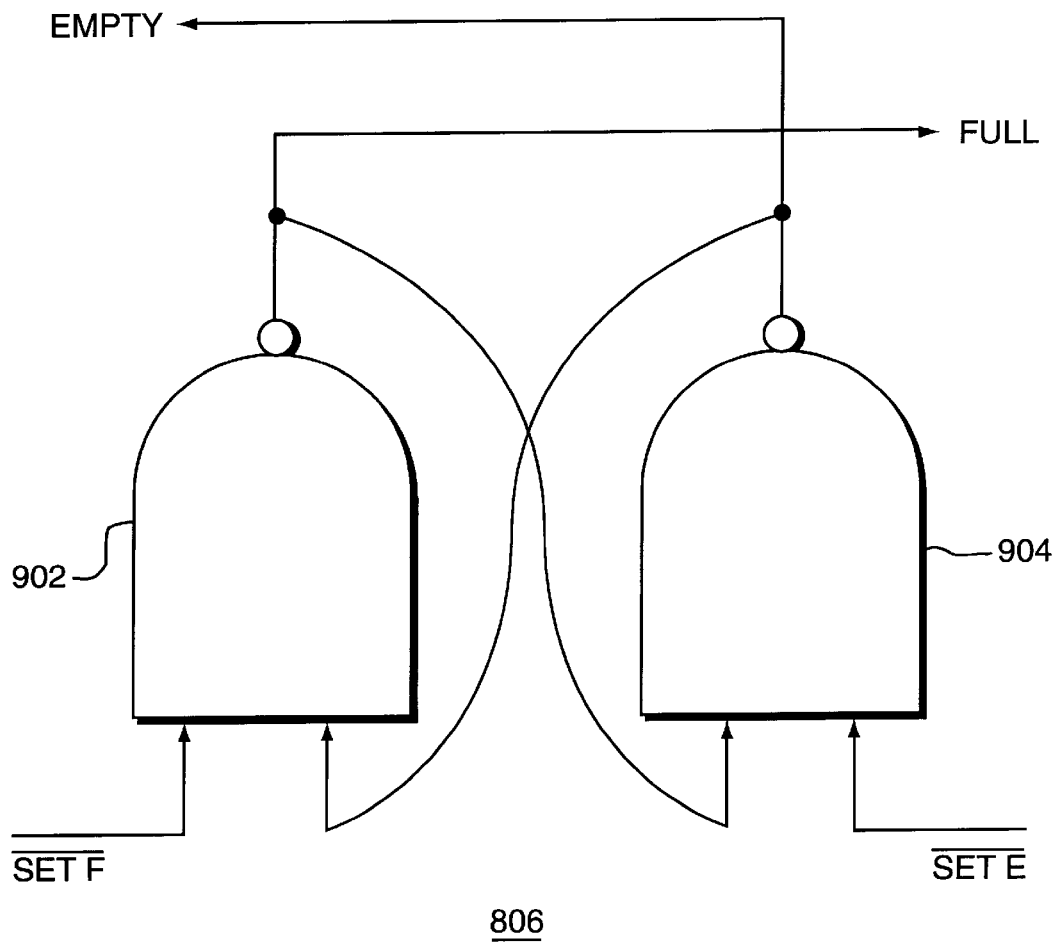
FIG. 9 is a preferred circuit diagram of a set-reset latch used in the second embodiment.

FIGS. 8 and 9 show a second embodiment for the control structure of an asynchronous FIFO memory according to this invention. This embodiment is similar to the embodiment in FIGS. 4–7 in that asynchronous FIFO memory 800 stores its data elements in serially-connected data registers 802, 803, and 804. In FIGS. 8 and 9, however, each stage has identical control circuitry (set-reset latches 806) and detection circuitry (logic gates 810).

Registers 802 through 804 receive data at input D and transfer the received data to the output Q according to the signal at gate input G. Gate input G of each flip-flop 802 through 804 connects to the Full (F) output of set-reset latches 806. Logic gates 810 receive as inputs the Full output of one set-reset latch 806 and the Empty output of a succeeding set-reset latch 806.

In normal operation, the Full and Empty outputs of latches 806 are static complements of one another. A high logic state at the Full output of the set-reset latch driving data register 803 causes data register 803 to retain the present value of its output Q, which is connected to the data input D of the next data register 804. Alternatively, a low logic state at the Full output of the set-reset latch causes data register 803 to unlatch the present value of its data output Q, thereby allowing data register 803 to receive a new data value from its preceding data register 802 and pass this new data value to the data input D of the succeeding data register 804.

Logic gates 810 are preferably NAND gates, but may be other logic depending on the particular implementation of the set-reset latches. In operation, logic gates 810 receive the Full output signal of the preceding set-reset latch and the Empty output signal of the succeeding set-reset latch, and when both are present, the output of the NAND gate becomes low. It then drives the preceding set-reset latch from the Full state to the Empty state, and the succeeding set-reset latch from the Empty state to the Full state, thereby initiating the unlatching of the preceding data register and the latching of the succeeding data register. These actions move a data value held in the preceding data register into the succeeding data register, and make the preceding register ready to accept its next data value.

Whenever the preceding set-reset latch reaches the Empty state, or the succeeding set-reset latch reaches the Full state, logic gate 810 is no longer activated, and the output of the NAND gate becomes high, thereby no longer driving the preceding or succeeding set-reset latches to the Empty and Full states, respectively. If necessary, additional circuit delay elements may be inserted into the set-reset latches and in logic gates 810 so that these steps are properly coordinated.

FIG. 9 is a preferred circuit diagram of set-reset latch 806. NAND gate 902 and NAND gate 904 are cross-coupled so NAND gate 902 receives the Set⌐F signal at one input and the output of NAND gate 904 at its second input. NAND gate 904 receives the Set⌐E signal at its second input and the output of NAND gate 902 at its first input.

The set-reset latches and logic gate 910 may also be implemented with NOR gates instead of NAND gates, but NAND gates are more efficient in silicon implementations using known manufacturing techniques.

Table II illustrates exemplary timing relationships of two neighboring set-reset latches 806 and logic gate 810. Columns A through E in Table II correspond to the points labeled A through E in FIG. 8.

TABLE II

| Time Interval | A | B | C | D | E | Description |
|---|---|---|---|---|---|---|
| 0 | high | low | low | high | X | First latch is full, its succeeding latch is empty. |
| 1 | high | low | low | high | low | The high values at A and D cause the NAND gate to become low. |
| 2 | high | high | high | high | low | The low value at the output of the NAND gate causes the set-reset latches to begin to toggle. At this point, the states at points B and C have changed. |
| 3 | low | high | high | low | low | The set-reset latches finish changing. |
| 4 | low | high | high | low | high | The low values at A and D cause the NAND gate to become high. Circuit is now in a steady-state. |

At time interval zero, the initial state, points A and D are high, and B and C are low. This corresponds to the first latch indicating the Full state (A is high) and the second latch indicating the Empty state (C is low). Table II shows the signals asynchronously propagating through the circuit until the first latch becomes Empty (A is low) and the second latch becomes Full (C is high).

Figure 10:
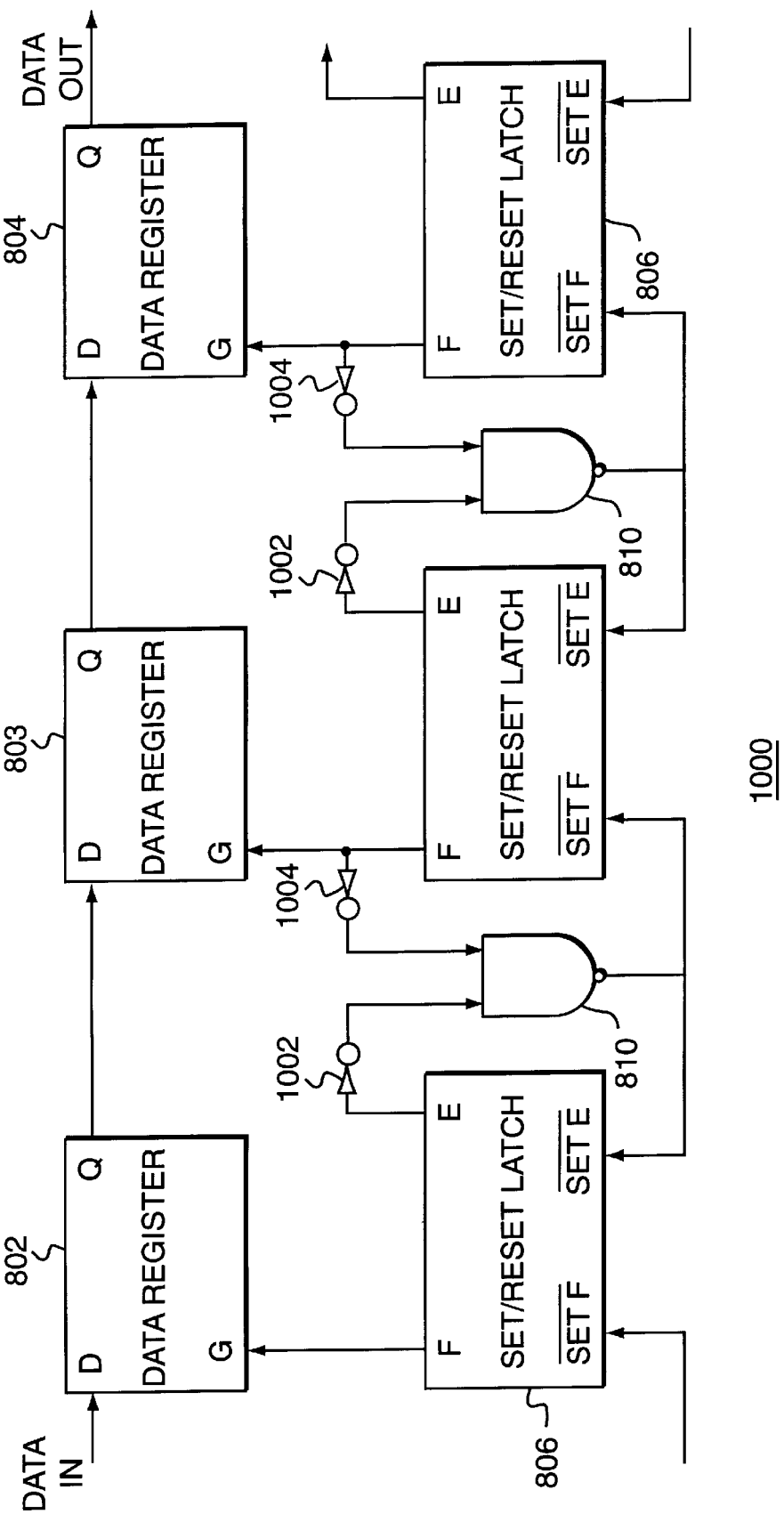
FIG. 10 is a block diagram illustrating control structure for an asynchronous FIFO memory according to a third embodiment.

FIG. 10 is a block diagram illustrating a control structure for an asynchronous FIFO memory according to a third embodiment. As with the second embodiment, FIFO memory 1000 stores its data elements in serially-connected registers 802 through 804 controlled by control circuitry (set-reset latches) 806 and detection circuitry (a logic NAND gate) 810. Unlike FIFO memory 800, however, FIFO memory 1000 includes two additional inverters, 1002 and 1004, per stage. Also, instead of connecting the Full output from the previous stage and the Empty output from the succeeding stage to input of logic gate 810, in FIFO memory 1000 the Empty output from the previous stage and the Full output from the succeeding stage are connected through inverters 1002 and 1004, respectively, to the input of logic gate 810.

FIFO memory 1000 operates similarly to FIFO memory 800. Because the Full and Empty outputs of set-reset latch 806 operate as static-state complements of one another, the inverted inputs to logic gates 810, as used in FIFO memory 1000, are logically equivalent to the noninverted inputs entering logic gates 810 in FIFO memory 800.

Although the static-state analysis of set-reset latch 806 indicates that outputs E and F are logical complements, this is not necessarily true while the state of the latch is changing states. Simulations of long pipelines (64 or more stages) of FIFO memory 800 indicate that losses of information may occur after data have propagated through many stages. Such losses appear to result from set-reset latches 806 and NAND gates 810 reaching pathological control states.

The control circuit used in FIFO 1000, unlike that of FIFO 800, does not possess control states other than those accessed in normal operation. The difference arises from inverters 1002 and 1004 generating a high signal at the input of NAND gates 810. Inverter 1002 receives its input from output E of set-reset latch 806 and inverter 1004 receives its input from output F of the succeeding set-reset latch 806. In the control circuit for FIFO 800, the corresponding input to NAND gates 810 come directly from the F output of set-reset latch 806 and the E output of the succeeding set-reset latch 806.

Although ordinary logical analysis indicates that the two circuits are logically equivalent in the static condition, simulations of long FIFO chains using control circuit 1000 have shown reliable operation. These simulations have been confirmed by tests on experimental circuits fabricated using a 0.6 micron CMOS process. The experimental chips have operated at up to about 1 GHz without data loss.

The principles discussed above may be used to control more complex asynchronous circuits.

Asynchronous pipeline control circuitry, in accordance with this invention, capable of controlling a counterflow pipeline will next be described with reference to FIGS. 11 and 12. The basic design of this control circuitry is similar to that used in the third embodiment. Because a counterflow pipeline comprises two pipelines flowing in opposite directions, two control circuits are required—one for each pipeline. Generally, each control circuit operates independent of the other control circuit, moving their corresponding data elements when one stage is Full and the succeeding stage is Empty. However, in this embodiment, the control circuitry corresponding to each pipeline additionally interacts with one another to prohibit data elements in the two pipelines from simultaneously passing one another.

Figure 11:
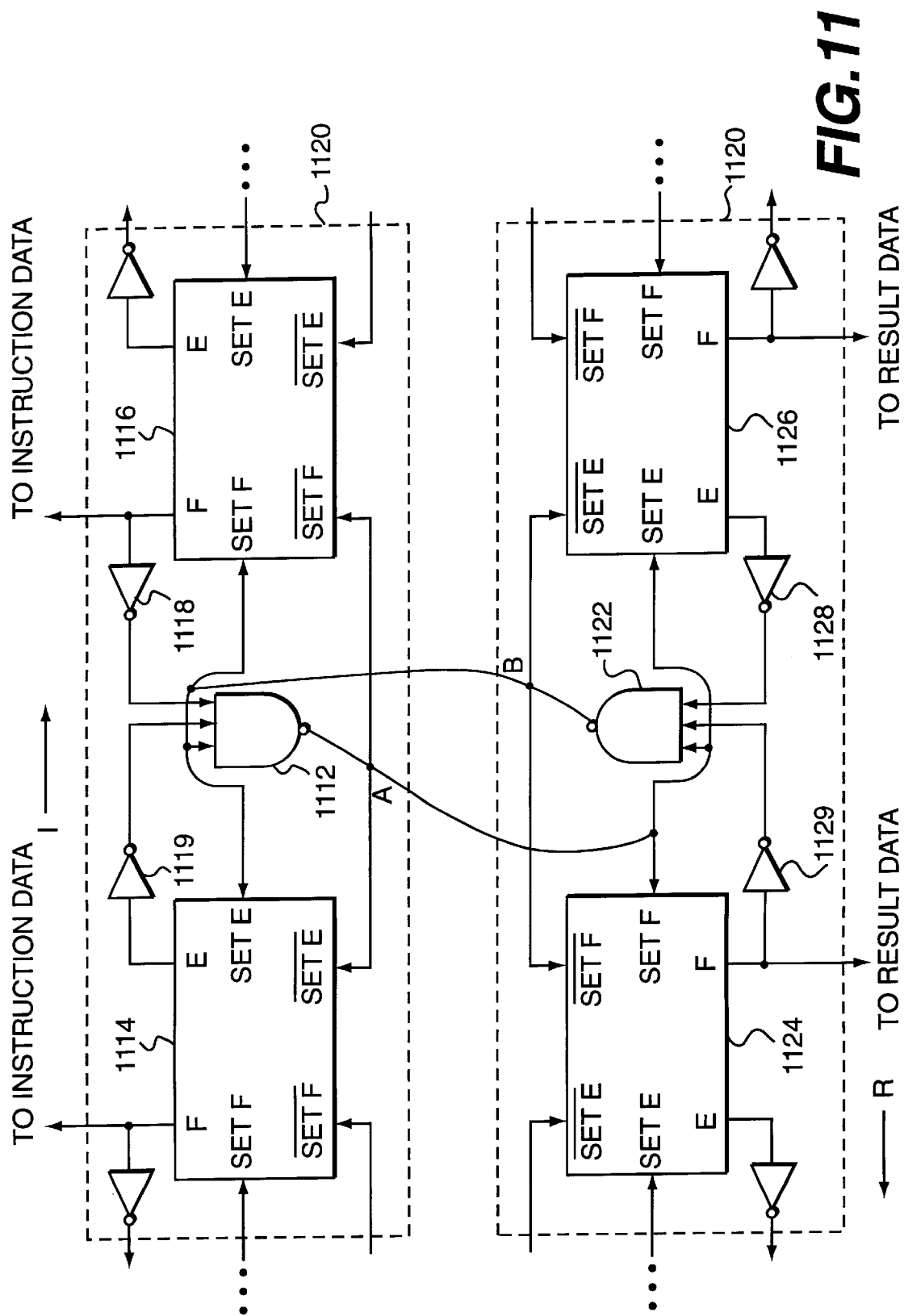
FIG. 11 is a circuit diagram of asynchronous pipeline control circuitry capable of controlling a counterflow pipeline according to a fourth embodiment of the invention.

FIG. 11 is a circuit diagram of asynchronous pipeline control circuitry capable of controlling a counterflow pipeline according to a fourth embodiment of the invention.

Control circuitry 1110 controls the movement of data elements through the first pipeline (the instruction pipeline), and includes logic gate 1112, set-reset latches 1114 and 1116, and inverters 1118 and 1119. Logic gate 1112 receives the inverted Full output of set-reset latch 1116 and the inverted Empty output of set-reset latch 1114. The output of logic gate 1112 is input to the Set⌐E and Set⌐F inputs of latches 1114 and 1116, respectively. Additionally, unlike the third embodiment, in this embodiment, the output of the opposing gate logic 1122 (labeled as output B) is received by logic gate 1112, the Set E input of set-reset latch 1114, and the Set F input of set-reset latch 1116.

Control circuitry 1120 controls the movement of data elements through the second pipeline (the result pipeline), and includes logic gate 1122, set-reset latches 1124 and 1126, and inverters 1128 and 1129. Logic gate 1122, set-reset latch 1124, and set-reset latch 1126 are arranged similarly to that in control circuitry 1110. In particular, the output of the opposing logic gate 1112 (labeled as output A) is received by gate logic 1122, the Set E input of set-reset latch 1120, and the Set F input of set-reset latch 1124.

The operation of control circuitry 1110 and 1120 may be conceptualized as occurring in two modes. The first mode of operation occurs when a Full value is ready to propagate through either one but not both of set-reset latches 1114 or 1126 to the next (Empty) set-reset latch 1116 or 1124. For example: if output E on set-reset latch 1114 is low, indicating this latch is Full; the output F on set-reset latch is low, indicating this latch is empty; and the signal at point B is high, indicating control circuit 1120 is not ready to propagate data elements, NAND gate 1112 changes its output at point A to low, causing set-reset latches 1114 and 1116 to each change states. The low value at point A disables set-reset latches 1124 and 1126 from changing states by "locking" NAND gate 1122 to a high value. Therefore, even if set-reset latches 1124 and 1126 subsequently change state so that set-reset latch 1126 is Full and set-reset latch 1124 is Empty, the Full state of latch 1126 will not propagate to the Empty state of latch 1124 until NAND gate 1112 "unlocks" NAND gate 1122.

The second mode of operation occurs when both sets of set-reset latches become ready to transfer data at the same time. In this situation, both NAND gates 1112 and 1122 receive high values on their three inputs simultaneously, or nearly simultaneously, causing them to enter a metastable operation state. In the metastable state, the outputs of NAND gates 1112 and 1122 are indeterminate between a logic high voltage and a logic low voltage. Eventually, the metastable condition will resolve itself and one of the NAND gates will become low and the other will become high. The NAND gate that becomes low signals its set-reset latches to change state and locks the "losing" NAND gate high. For proper circuit operation, set-reset latches 1114, 1116, 1124, and 1126 should not react to the intermediate voltages present at points A and B in the metastable condition. This is achieved by the use of a modified set-reset latch circuit.

Figure 12:
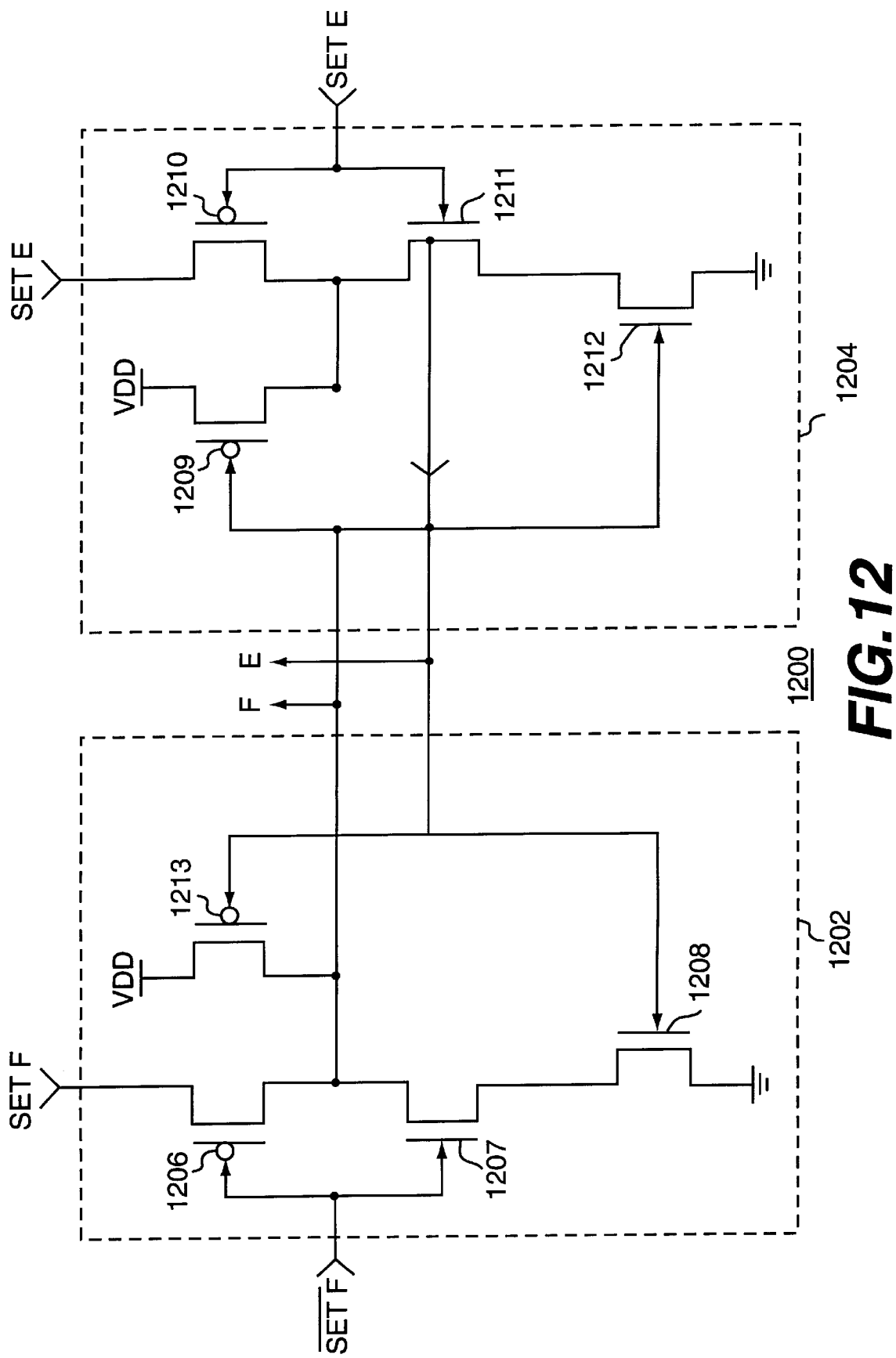
FIG. 12 is a circuit diagram of set-reset latches used in the pipeline of FIG. 11.

FIG. 12 is a preferred circuit diagram 1200 of modified set-reset latches 1114, 1116, 1124, and 1126. Set-reset latch 1200 comprises two modified cross-coupled NAND gates 1202 and 1204. Conventional NAND gates are identical to modified NAND gates 1202 and 1204, except that in a conventional NAND gate, the Set F input on NAND gate 1202 and the Set E input on NAND gate 1204 are coupled to Vdd. By coupling the source of PMOS transistor 1206 to Set F and the source of PMOS transistor 1210 to Set E, modified NAND gates 1202 and 1204 do not react until the voltages at points A and B in FIG. 11 are sufficiently different to exceed the threshold voltages of PMOS transistors 1206 and 1210 in the proper direction. In a metastable condition of circuits 1112 and 1122, the voltages at point A and point B are approximately the same, and remain so until the metastable condition resolves. Thus, set-reset latches 1124, 1126, 1114, and 1116 will wait until a metastable state at NAND gates 1122 and 1112 resolves itself and the voltages at points A and B become sufficiently different before changing state. Because the connections of point A and point B to set-reset latches 1114–1116 and 1126–1124 are reversed, a move action will occur in only one of the pipelines. Only when the move signal for that pipeline is removed will the other pipeline be able to execute its move.

Modified NAND gate 1202 comprises PMOS transistors 1206 and 1213, and NMOS transistors 1207 and 1208. The output of NAND gate 1202 represents the Full condition of set-reset latch 1200 and emanates from the terminal common to transistors 1206, 1207, and 1213. The two gate controlling inputs to the NAND gate are Set⌐F, which is received at the gates of transistors 1206 and 1207, and the output of NAND gate 1204, which is received at the gates of transistors 1213 and 1208.

Modified NAND gate 1204 is an identical mirror image of NAND gate 1202. NAND gate 1204 comprises PMOS transistors 1209 and 1210, and NMOS transistors 1211 and 1212. The output of NAND gate 1204 represents the Empty condition of set-reset latch 1200 and the two gate controlling inputs to the NAND gate are Set⌐E and the output of NAND gate 1202.

In addition to a counterflow pipeline, the principles described above in connection with the first three embodiments may also be used to control forking and merging pipelines.

Figure 13A:
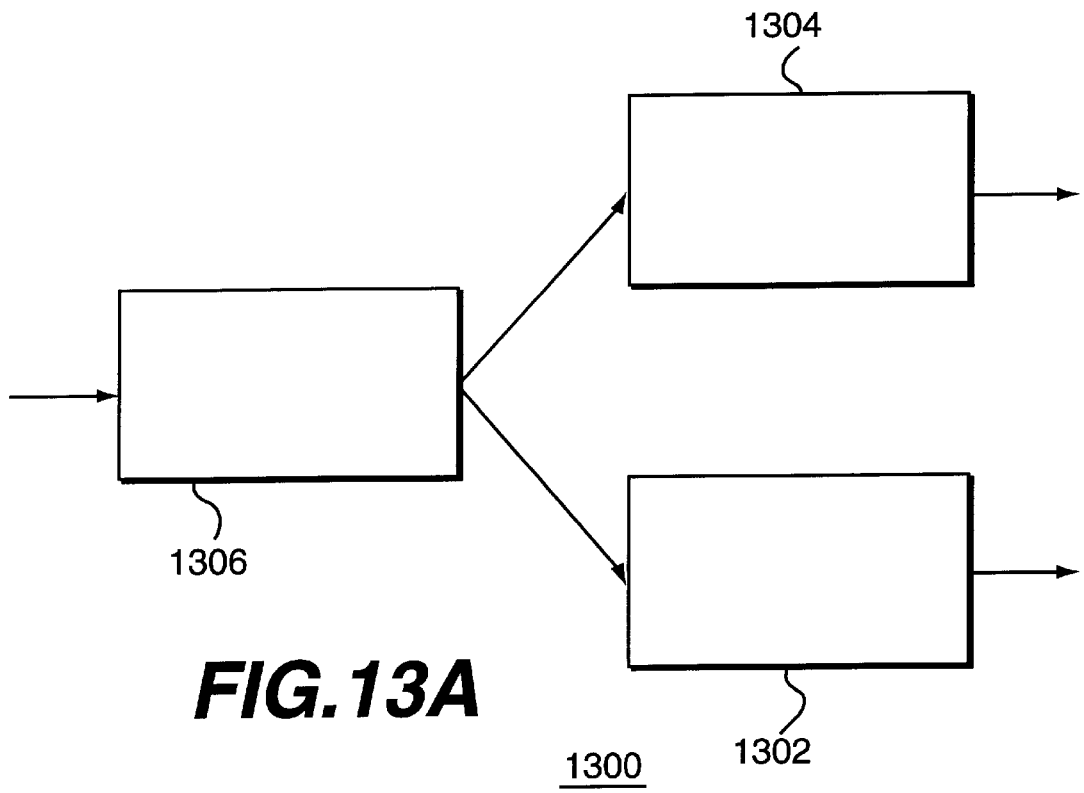
FIGS. 13A and 13B are diagrams illustrating two stages of a forking pipeline and two stages of a merging pipeline in accordance with this invention.
Figure 13B:
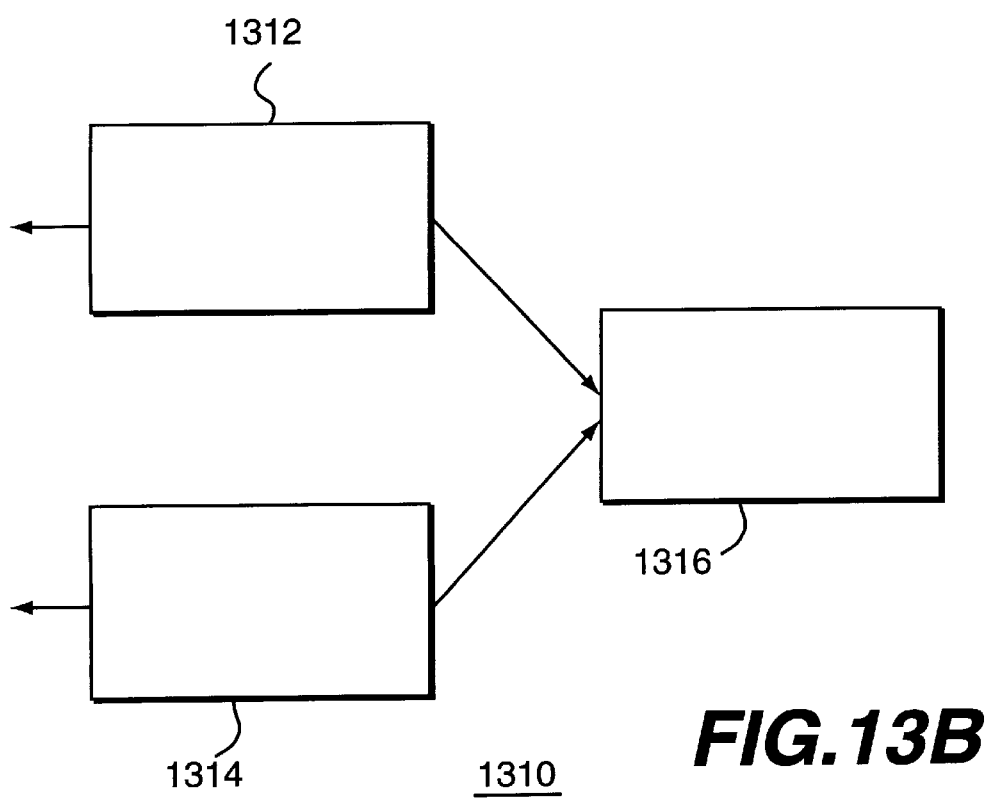

Asynchronous pipeline control circuitry capable of controlling forking and merging pipelines will next be described with reference to FIGS. 13–15. FIGS. 13A and 13B are conceptual diagrams illustrating two stages of a forking pipeline and two stages of a merging pipeline, respectively. In both figures, data flows from the left to the right. The control logic defining data movement between stages in forking pipeline 1300 is as follows: move the data in stage 1306 to stages 1302 and 1304 when stage 1306 is Full and both stages 1302 and 1304 are Empty. Conversely, the control logic defining data movement in merging pipeline 1310 is: move data from stages 1312 and 1314 into stage 1316 when both stages 1312 and 1314 are Full and stage 1316 is Empty.

Figure 14:
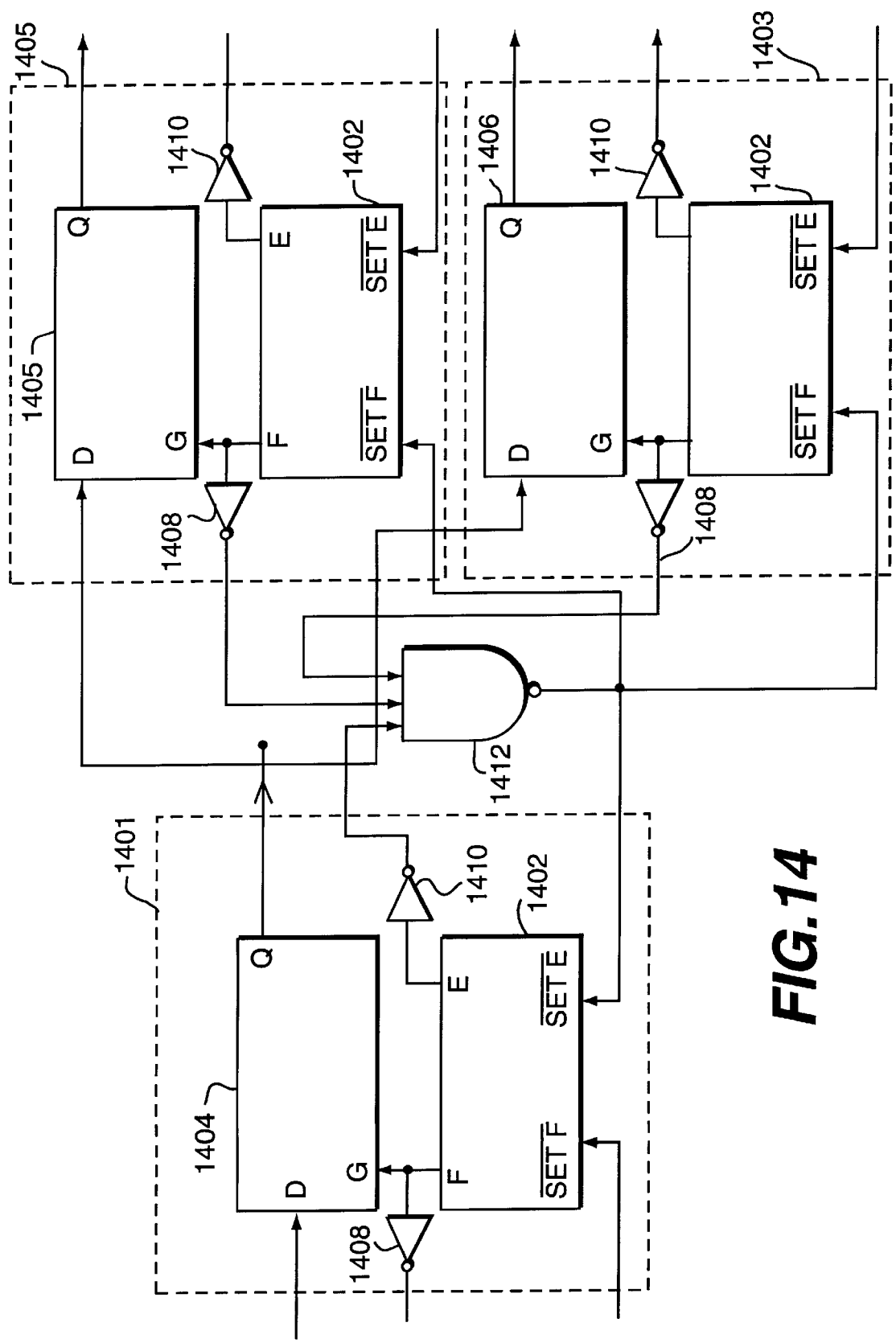
FIG. 14 is a block diagram of pipeline control circuitry for a forking asynchronous pipeline according to a fifth embodiment.

FIG. 14 is a block diagram illustrating pipeline control circuitry for a forking asynchronous pipeline according to a fifth embodiment. Stage 1401, the pre-fork stage, corresponds to stage 1306 in FIG. 13A. Stages 1403 and 1405, the post-fork stages, corresponds to stages 1302 and 1304, respectively. Each stage 1401, 1403, and 1405 includes set-reset latches 1402, one of registers 1404 through 1406, and inverters 1408 and 1410. This structure is identical to set-latches 806, registers 802 through 804, and inverters 1002 and 1004, as used in the third embodiment. Detection circuitry 1412, however, is a three-input NAND gate whereas the third embodiment has two-input NAND gate 810. The output of NAND gate 1406 is input to the Set⌐E input of the pre-fork set-reset latch and to the Set⌐F input of the post-fork set-reset latches.

Similar to the third embodiment, in this embodiment, a common move signal generated by NAND gate 1412 causes the pre-fork set-reset latch to become Empty and the post-fork set-reset latches to become Full. Concomitant with latches 1402 changing state, the data in register 1404 transfers to registers 1405 and 1406.

Figure 15:
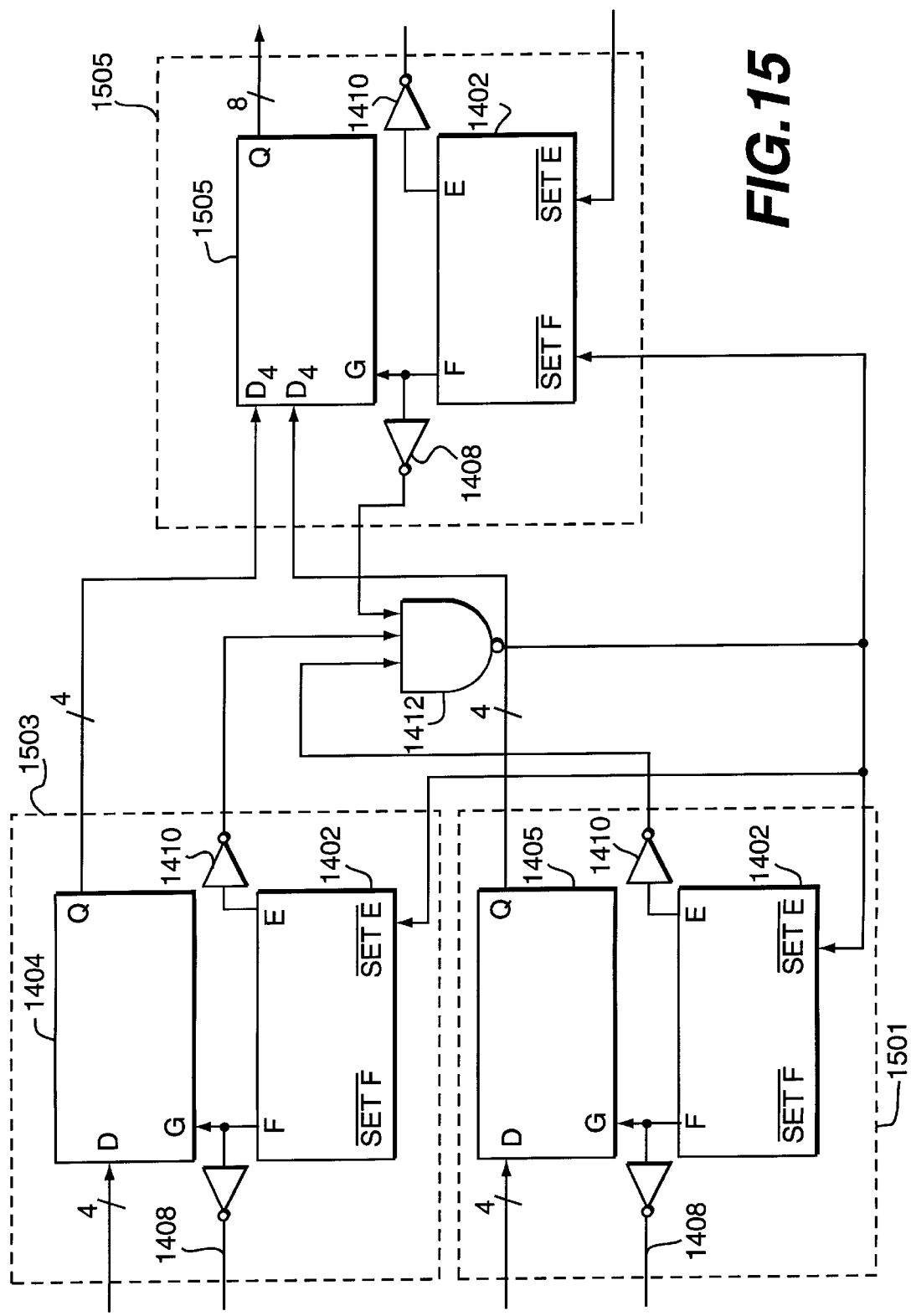
FIG. 15 is a block diagram of pipeline control circuitry for a merging asynchronous pipeline according to a sixth embodiment.

FIG. 15 is a block diagram illustrating pipeline control circuitry for a merging asynchronous pipeline according to a sixth embodiment. The control logic for the merging pipeline is essentially a mirror image of the control logic for the forking pipeline. Stages 1501 and 1503 are the pre-merge stages, corresponding to stage 1312 and 1314 in FIG. 13B, and stage 1505 is the post-merge stages, corresponding to stage 1316.

Similar to the third embodiment, in this embodiment, a common move signal generated by NAND gate 1412 causes the pre-merge set-reset latches to change to Empty and the post-merge set-reset latches to become Full. Concomitant with latches 1402 changing state, the data in registers 1404 and 1405 transfers to register 1506. In this example, registers 1404 and 1405 are 4 bit registers and register 1506 is an eight bit register.

Although a two-pronged pipeline fork/merge using a three input NAND gate has been described, one could implement a three-pronged or greater pipeline fork/merge with a four input or greater NAND gate and additional pipeline stages. Additionally, although the sixth embodiment merged two four bit data elements into an eight bit data element, logic may operate on the two four bit streams and output a single four bit stream or perform other functions such as the four-bit sum of two four-bit data elements from the two merging pipelines.

As the previous discussion explains in detail, by tightly binding the relative timing of asynchronous pipeline control and transfer elements, pipeline operating speed can be significantly increased. Three basic embodiments have been disclosed for performing such binding. Further, extensions of these principles have been described for counterflow pipelines, forking pipelines, and merging pipelines. The insertion of circuitry between data registers to calculate functions of pipeline data has been disclosed and can be applied in many ways.

It will be apparent to those skilled in the art that various modifications and variations can be made to the present invention without departing from the scope or spirit of the invention. For example, although the embodiments describe FIFO circuits devoid of logic for processing the data elements as they pass from data register to data register, one could insert processing logic between the FIFO memory stages to create a pipelined data processor.

Other embodiments of the invention will be apparent to those skilled in the art from consideration of the specification and practice of the invention disclosed herein. The specification and examples are exemplary only. The true scope and spirit of the invention is instead indicated by the following claims and their equivalents.

What is claimed is:

1. Circuitry for controlling an asynchronous pipeline including a plurality of stages, comprising:
    a first control circuit controlling a transfer state of a first one of the plurality of stages;
    a second control circuit controlling a transfer state of a second one of the plurality of stages, serially coupled to the first stage;
    a detection circuit connected to outputs of the first and second control circuits and generating a move signal for monitoring the transfer states of the first and second control circuits based on the outputs of the first and second control circuits, the move signal being received by the first and second control circuits;
    a first inverter connected between the first control circuit and the detection circuit; and
    a second inverter connected between the second control circuit and the detection circuit.

2. The control circuitry of claim 1, wherein the first and second control circuits each comprise a pair of cross-coupled NAND gates.

3. The control circuitry of claim 1, wherein the detection circuitry comprises a NAND gate.

4. The control circuitry of claim 1, further including:
    a third control circuit controlling a transfer state of a third one of the plurality of stages, serially coupled to the first stage;
    wherein the detection circuit further includes an input connected to an output of the third control circuit and the move signal generated by the detection circuit is received by the third control circuit.

5. Circuitry for controlling an asynchronous pipeline including a plurality of stages, comprising:
    a first control circuit controlling a transfer state of a first one of the plurality of stages;
    a second control circuit controlling a transfer state of a second one of the plurality of stages, serially coupled to the first stage;
    a detection circuit connected to outputs of the first and second control circuit generating a move signal for monitoring the transfer states of the first and second control circuits based on the outputs of the first and second control circuits, the move signal being received by the first and second control circuits; and
    the first and second control circuits each comprising:
        a PMOS transistor having a source terminal connected to a power supply and a drain terminal connected to a common node; and
        an NMOS transistor having a source terminal connected to the common node and a drain terminal connected to ground.

6. The control circuitry of claim 5, wherein the first and second control circuits each further comprise:
    an inverter having an input connected to the common node; and
    a keeper inverter having an input connected to an output of the first inverter and an output connected to the common node.

7. A computer memory, comprising:
    a first-in-first-out (FIFO) memory;
    a first control circuit including first and second transistors and having a first input, a second input, and an output that controls the FIFO memory;
    a second control circuit including first and second transistors and having a first input, a second input, and an output that controls the FIFO memory; and
    detection circuitry configured to monitor the transfer states and receive the output of the first control circuit and the output of the second control circuit, wherein the detection circuitry is further configured to generate a move signal according to the output of the first and second control circuits;
    wherein the generated move signal causes a change in the output of the first and second control circuits by turning on a gate input of one of the first and second transistors in each of the first and second control circuits.

8. The memory of claim 7, wherein the FIFO memory further comprises a plurality of serially connected registers, a gate input of one of said registers being connected to the output of the first control circuit, and a gate input of a second of said registers being connected to the output of the second control circuit.

9. The memory according to claim 8, wherein the first and second control circuits further comprise:
   a first inverter having an input connected to a common node, said common node connected to the first and second transistors, and said first inverter transmitting as an output the output of the respective outputs of the first and second control circuits; and
   a second inverter having an input connected to the output of the first inverter and having an output connected to the common node.

10. The memory of claim 9, wherein the detection circuit is a NAND gate.

11. The memory of claim 10, wherein the detection circuit is a NAND gate connected to an inverter.

12. Circuitry for controlling an asynchronous counterflow pipeline, including a first pipeline and a second pipeline flowing in opposite directions, comprising:
   a first control circuit controlling a transfer state of a first stage of the first pipeline;
   a second control circuit controlling a transfer state of a second stage of the second pipeline, the first and second stages being adjacent to one another; and
   a first detecting circuit connected to outputs of the first and second control circuits and a second detection circuit from the second pipeline, the first detection circuit monitors the transfer states of the first and second control circuit, and generates a move signal based on the outputs of the first and second control circuits and the second detection circuit, and transmitting the move signal to the first and second control circuits and the second pipeline.

13. The control circuitry of claim 12, wherein the first and second control circuits are cross-coupled NAND gates configured as a mutual exclusion circuit that permits only one of the two counter flowing pipelines to move at once.

14. The control circuitry of claim 13, wherein each NAND gate of the cross-coupled NAND gates further comprises:
   a first transistor connected to a first input signal at its source, a second input signal at its gate, and connected to the output of the NAND gate at its drain;
   a second transistor connected to Vdd at its source, a third input signal at its gate, and connected to the output of the NAND gate at its drain;
   a third transistor connected to the second input signal at its gate and the output of the NAND gate at its source; and
   a fourth transistor connected to the drain of the third transistor at its source, the third input signal at its gate, and ground at its drain.

15. The control circuitry of claim 14, wherein the first and second transistors are PMOS transistors and the third and fourth transistors and NMOS transistors.

* * * * *